United States Patent [19]
Ueno et al.

[11] Patent Number: 5,418,570
[45] Date of Patent: May 23, 1995

[54] MOTION PICTURE CODING APPARATUS

[75] Inventors: Hideyuki Ueno, Tokyo; Yoshihiro Kikuchi, Yokohama; Noboru Yamaguchi, Yashio; Toshinori Odaka, Yokohama; Tadahiro Oku, Urayasu, all of Japan

[73] Assignee: Kabushiki Kaisha Toshiba, Kawasaki, Japan

[21] Appl. No.: 150,035
[22] PCT Filed: Mar. 3, 1993
[86] PCT No.: PCT/JP93/00275
 § 371 Date: Nov. 19, 1993
 § 102(e) Date: Nov. 19, 1993
[87] PCT Pub. No.: WO93/18618
 PCT Pub. Date: Sep. 16, 1993

[30] Foreign Application Priority Data

Mar. 3, 1992 [JP] Japan ................... 4-45678
Aug. 31, 1992 [JP] Japan ................... 4-253466
Dec. 28, 1992 [JP] Japan ................... 4-349536

[51] Int. Cl.$^6$ ............................. H04N 7/137
[52] U.S. Cl. ........................ 348/413; 348/699
[58] Field of Search ............ 348/412, 413, 416, 699; H04N 7/137

[56] References Cited

U.S. PATENT DOCUMENTS 5,314,326  5/1994  Sugiyama ................... 348/416

OTHER PUBLICATIONS

MPEGII, "A Proposal of Hierarchical Video Signal Coding Scheme to MPEGII", Tsuyoshi Hanamura, et al., pp. 1–8 (Abstract only translation).

*Primary Examiner*—Howard W. Britton
*Assistant Examiner*—Richard Lee
*Attorney, Agent, or Firm*—Oblon, Spivak, McClelland, Maier & Neustadt

[57] ABSTRACT

A motion picture coding apparatus for performing predictive coding on a high-resolution picture signal and coding a low-resolution picture signal obtained by converting the high-resolution picture signal. One field is thinned out from one frame of a picture by a field skip circuit 102, the other field is down-sampled by a down-sampling circuit 29, thereby forming a low-resolution picture. A low-resolution predictive signal, obtained by up-sampling the low-resolution picture by an up-sampling circuit 35, and a high-resolution predictive signal, which is produced from a high-resolution picture and corresponds to the thinned-out one field, are alternately combined by a predictor 104 to form a predictive signal.

3 Claims, 22 Drawing Sheets

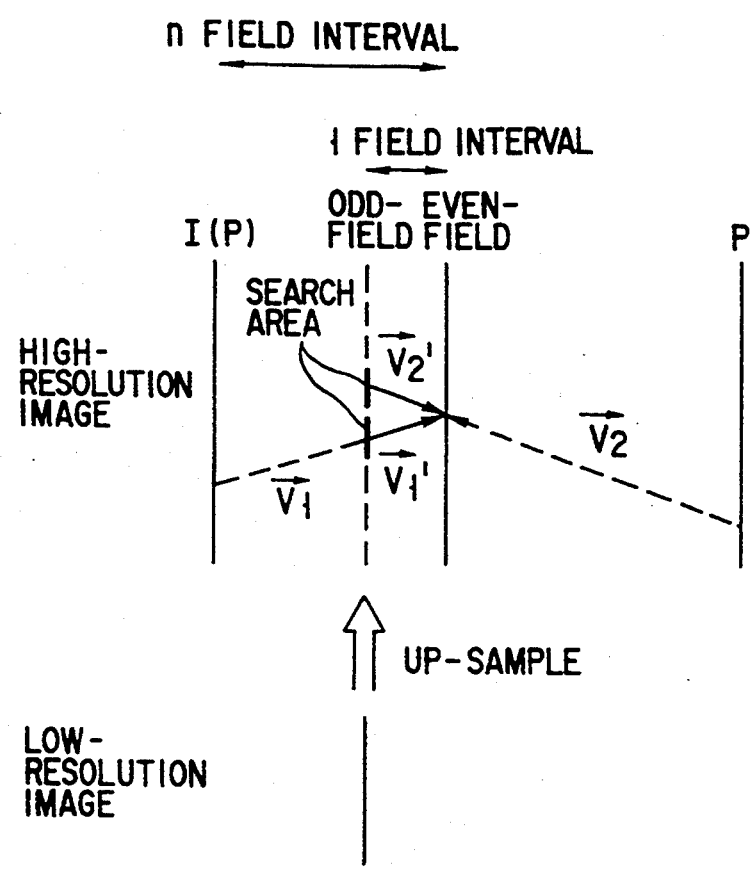
F I G. 6

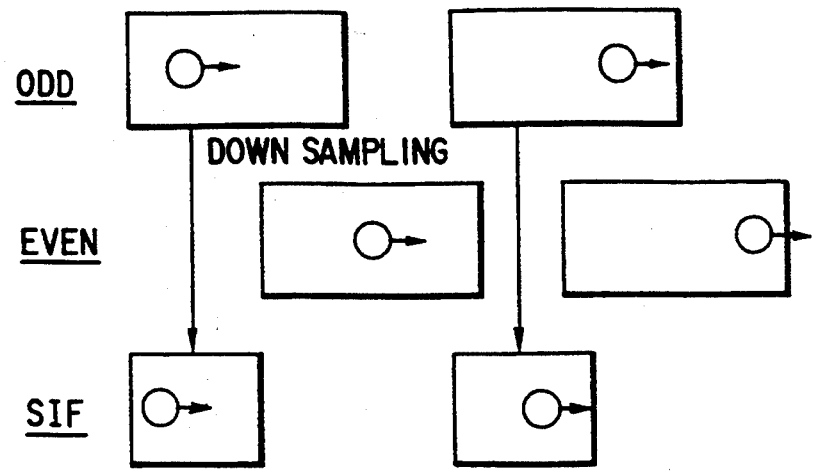
F I G. 8A
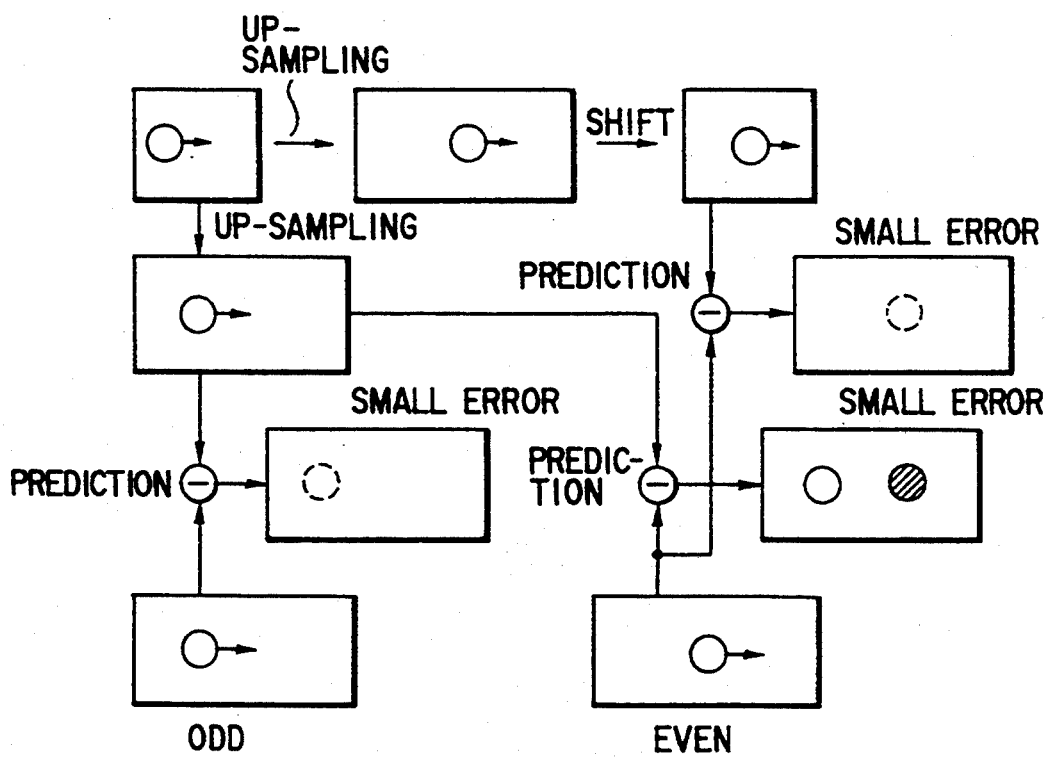
F I G. 8B

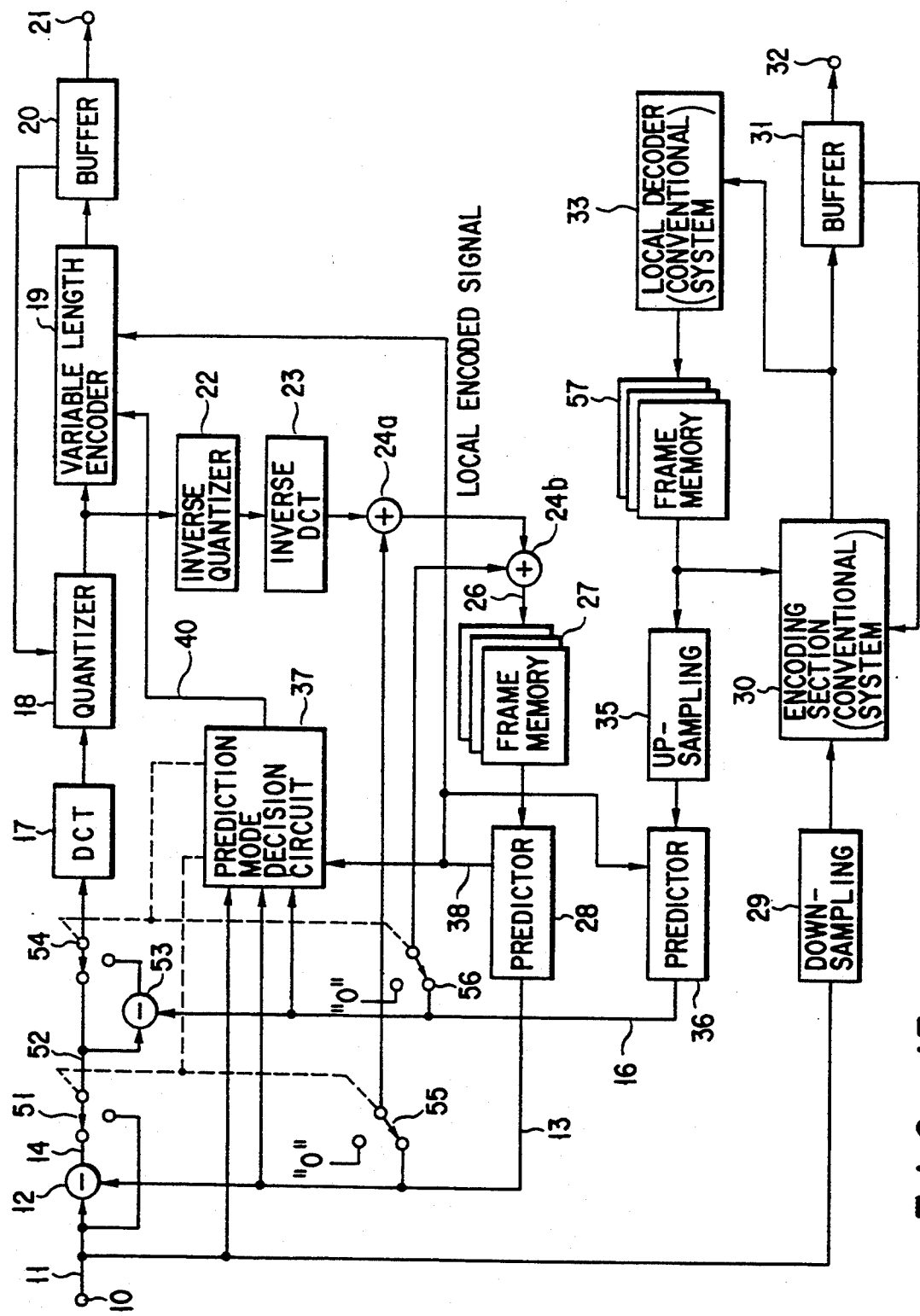
F I G. 13

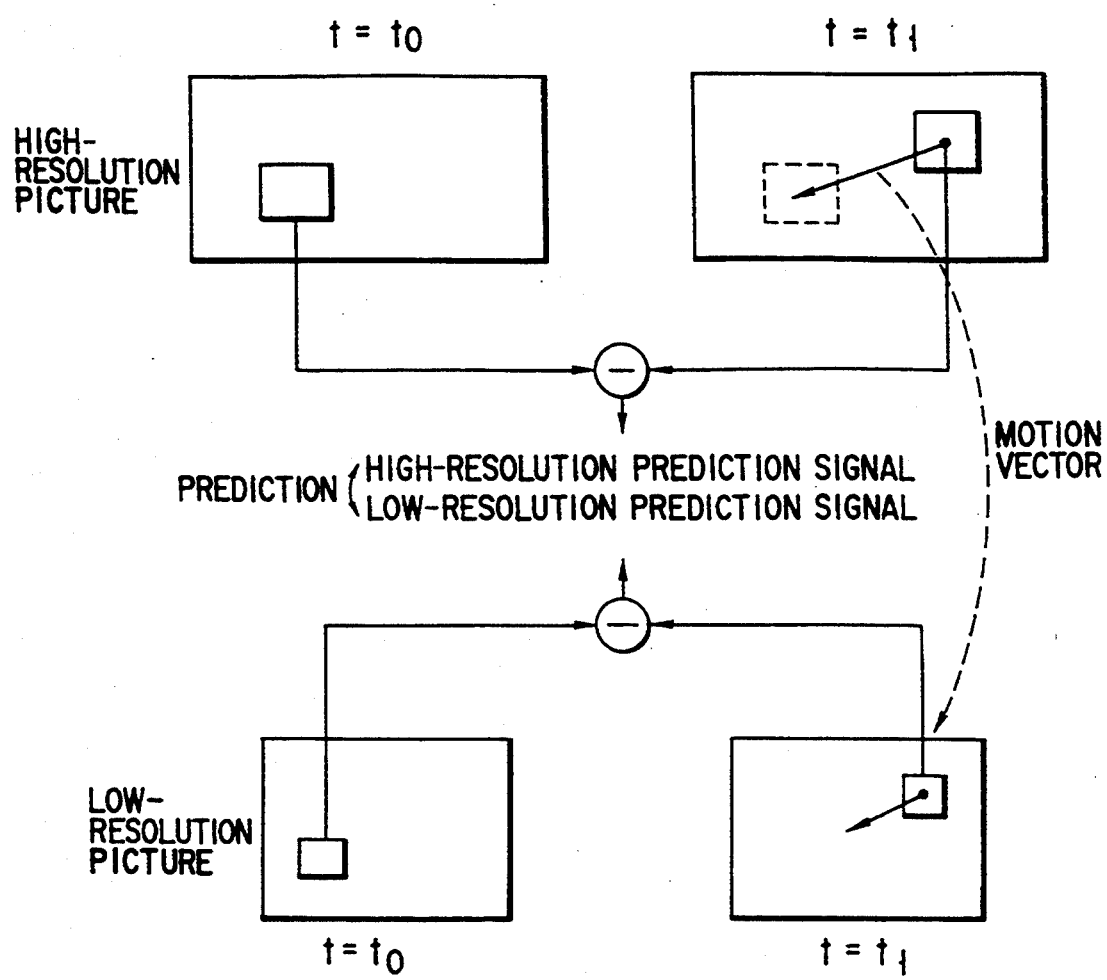
F I G. 14

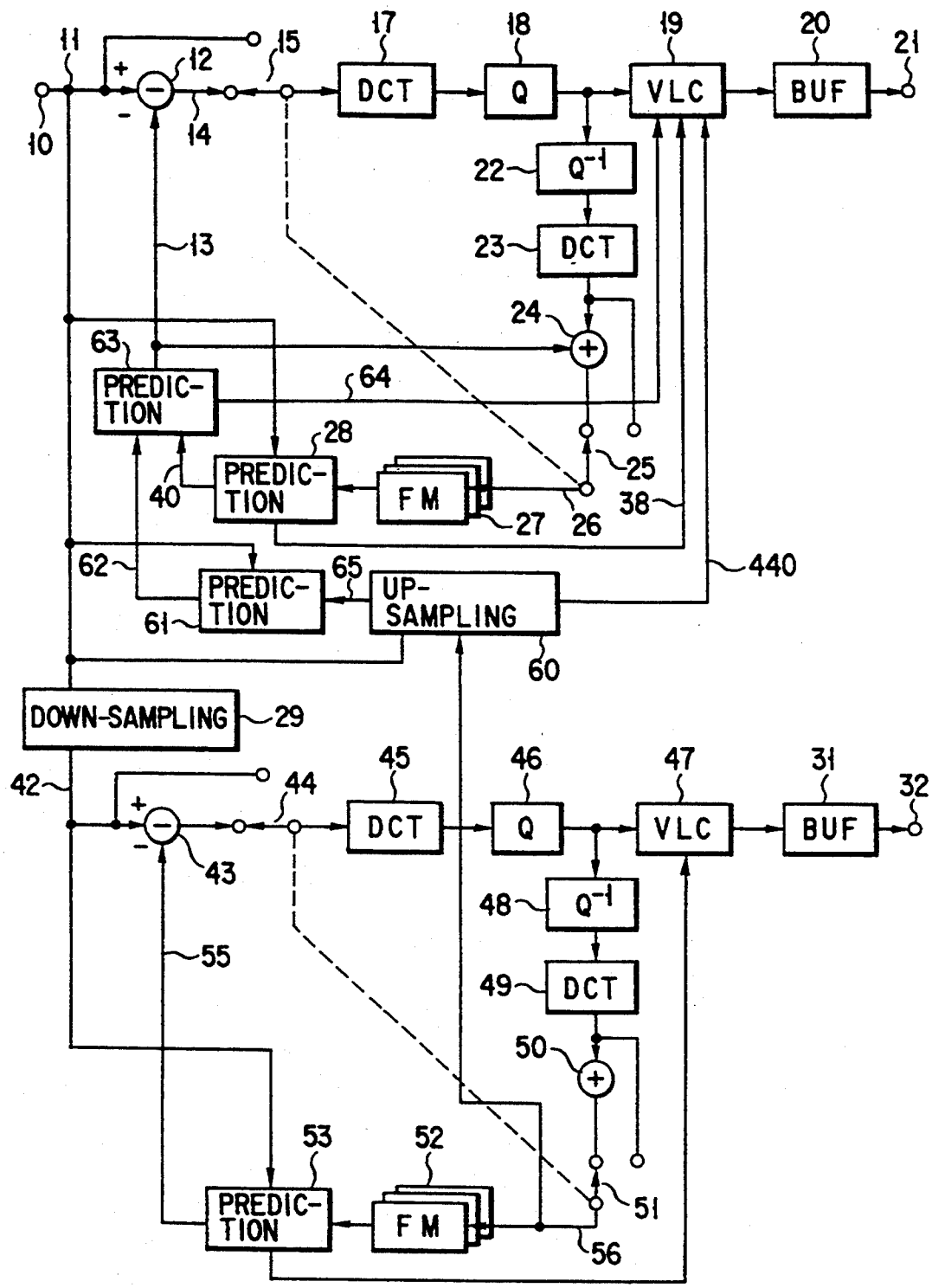
F I G. 15

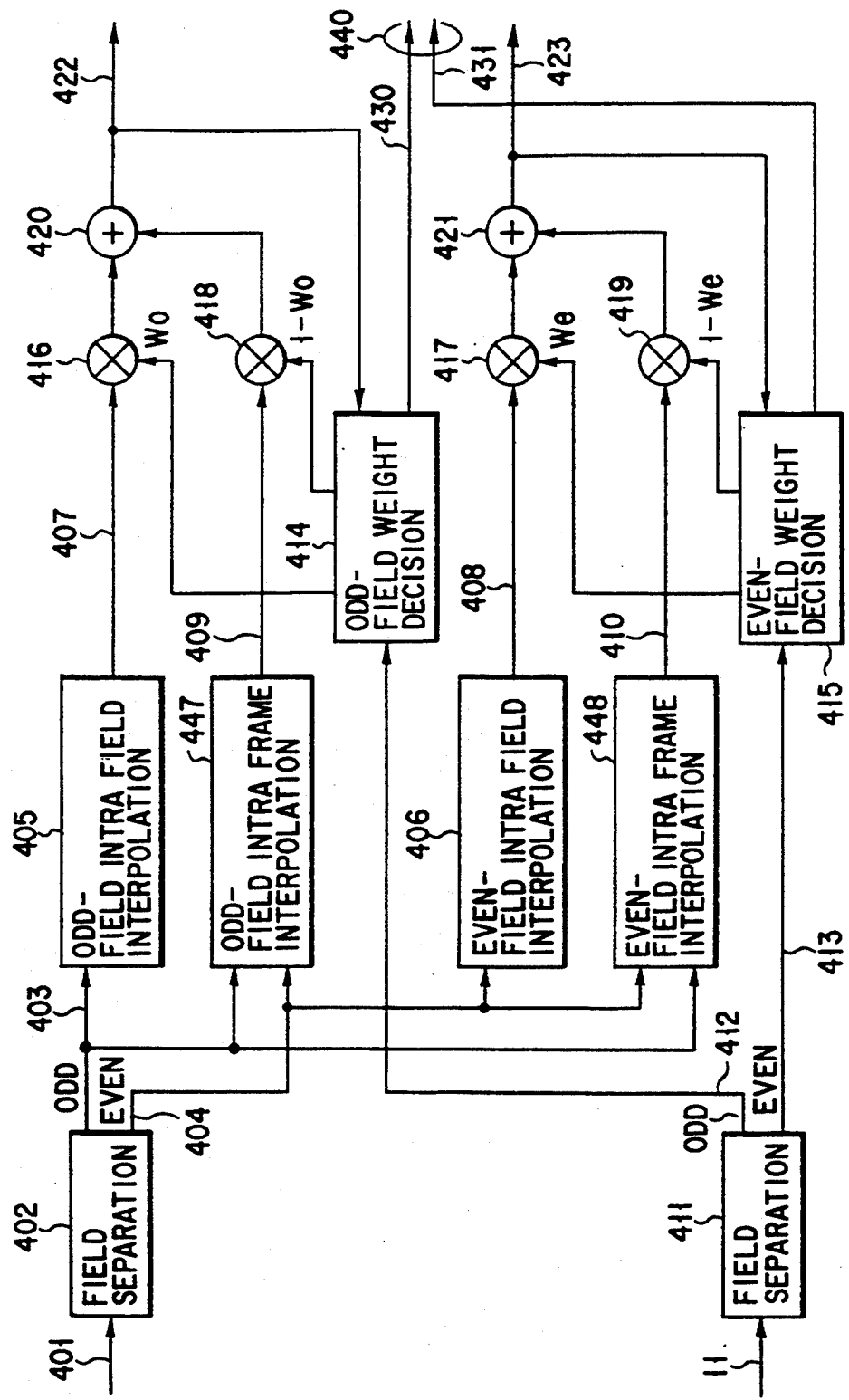
F I G. 19

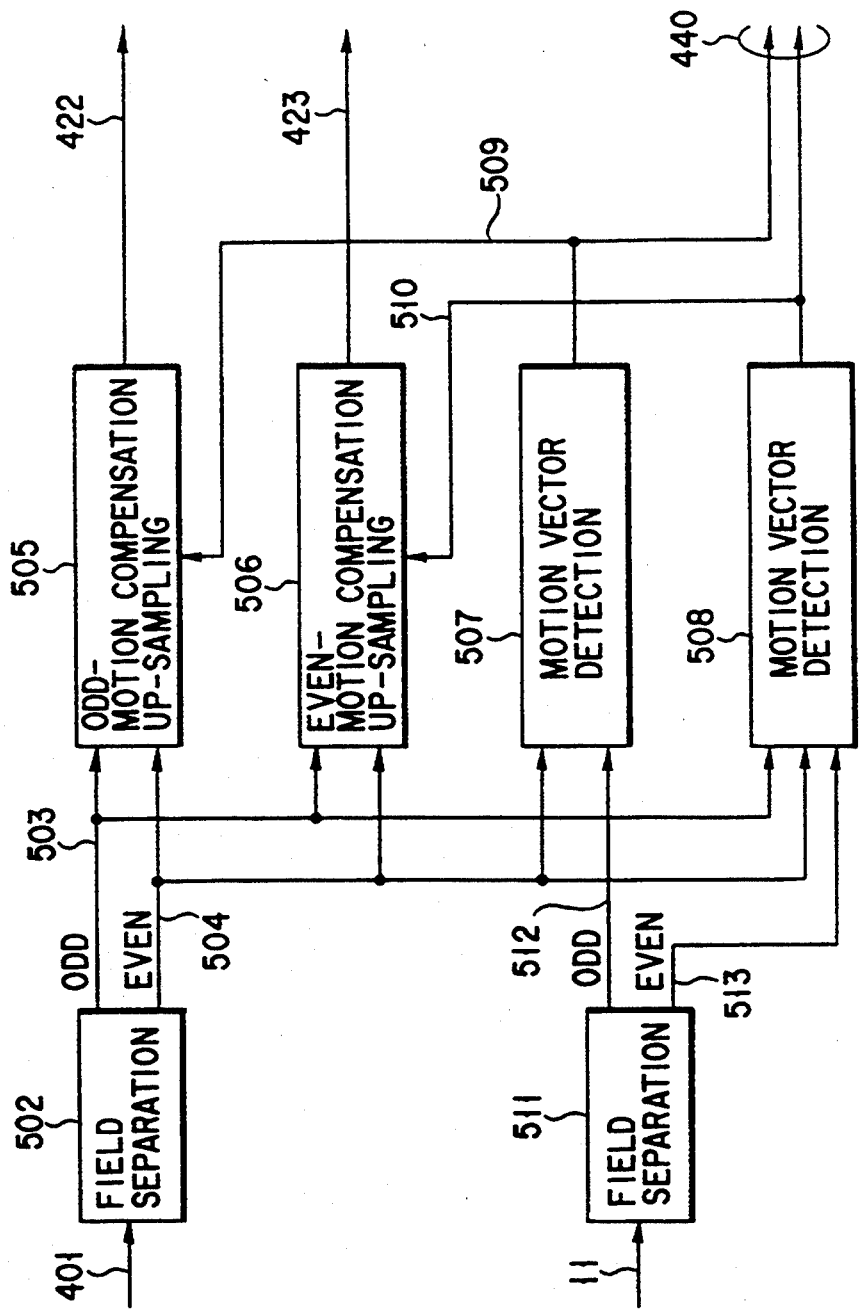
F I G. 20

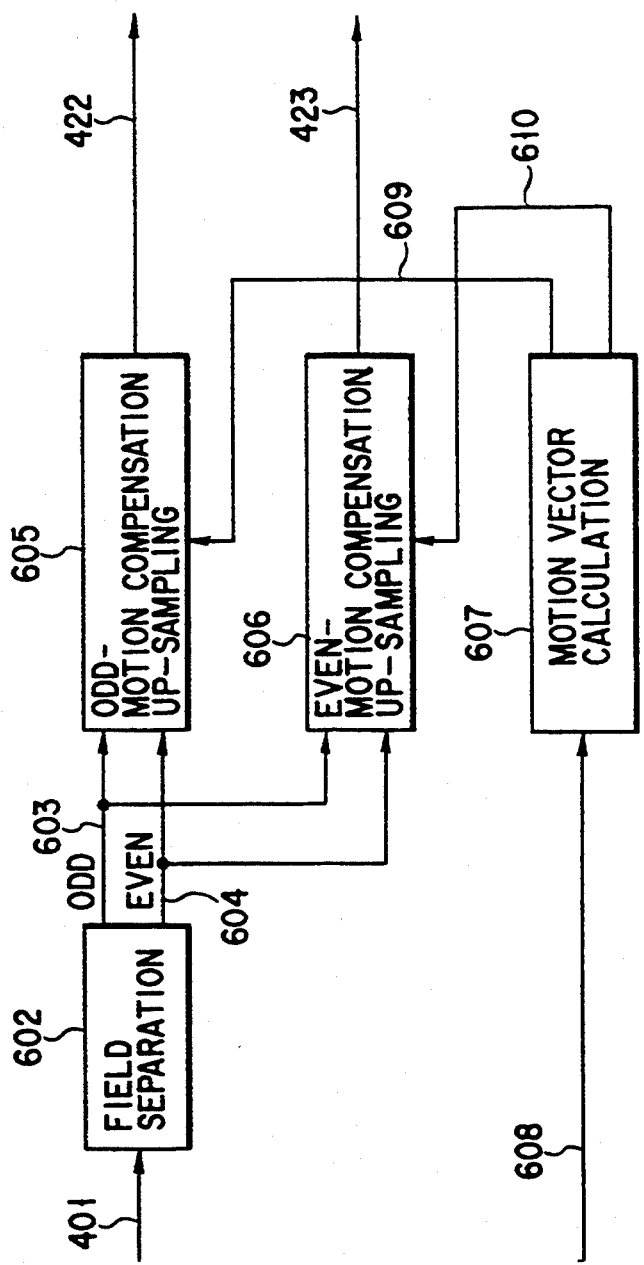
F I G. 21

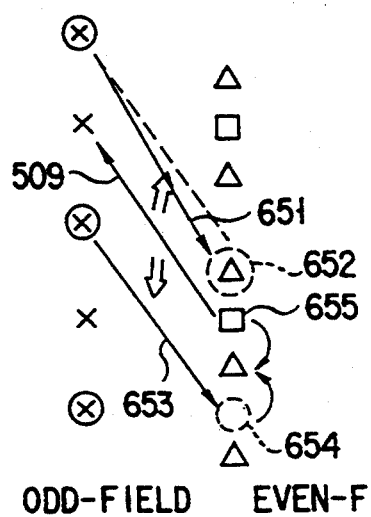
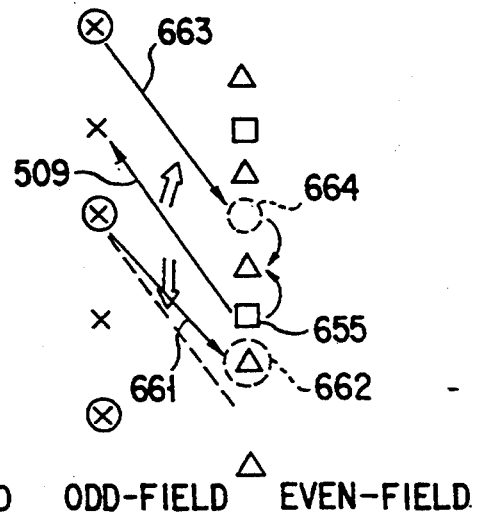
ODD-FIELD  EVEN-FIELD        ODD-FIELD  EVEN-FIELD
F I G. 22A              F I G. 22B
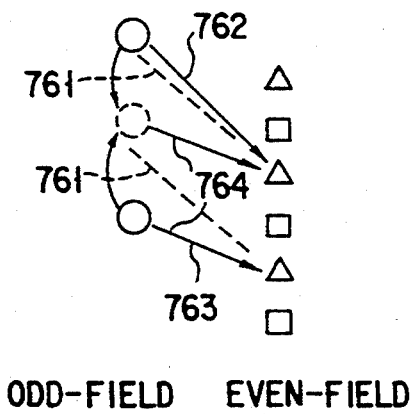
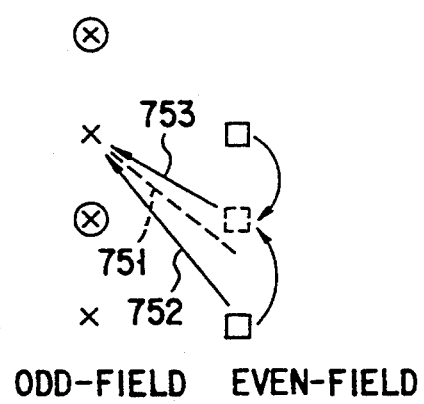
ODD-FIELD  EVEN-FIELD        ODD-FIELD  EVEN-FIELD
F I G. 23A              F I G. 23B

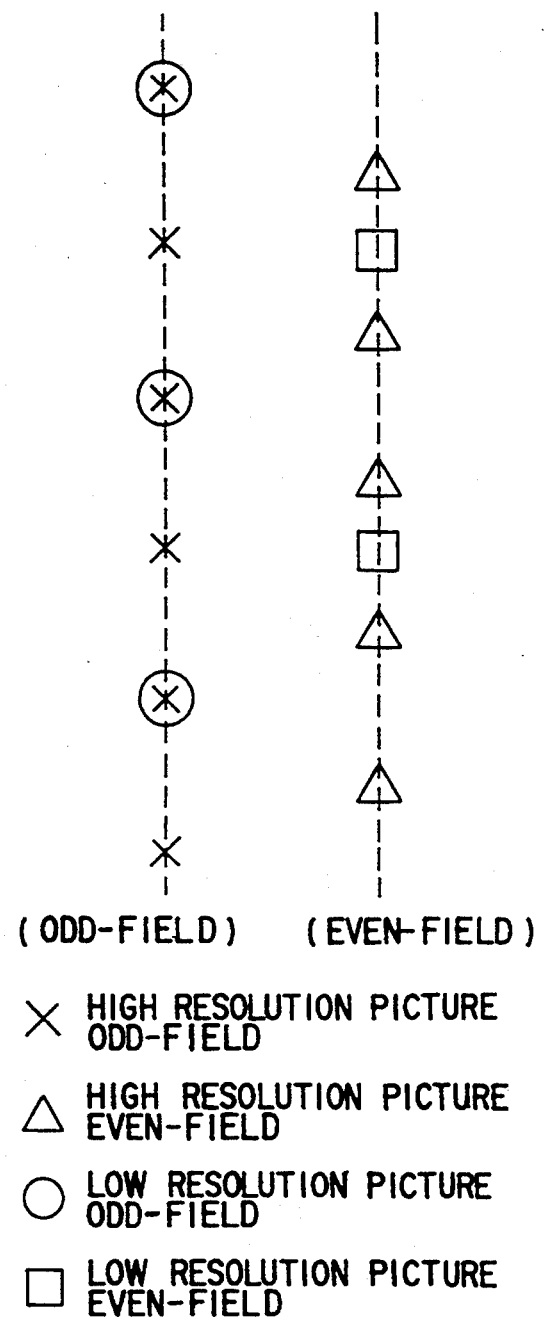
F I G. 25

MOTION PICTURE CODING APPARATUS

TECHNICAL FIELD

The present invention relates to a motion picture coding apparatus, and, more particularly, to a motion picture coding apparatus for use in a system, which transmits motion pictures over a line, such as a TV conference or a TV telephone, a system for storing motion pictures on a storage medium, such as an optical disk or a video tape, and digital television broadcasting.

Today, standardization for a scheme for transmitting motion pictures, which has high quality equal to or higher than the quality for the current TV system, at a rate of about several Mbps to several tens of Mbps has progressed in the communication field for future establishment of the service in a broad-band network (H. 26X). Likewise, in the fields of the storage system and broadcasting system, standardization for a coding system which has about the same picture quality and bit rate as H. 26X has progressed (MPEG2 for the storage system and CMTT/2 for the broadcasting system). Since it is considered advantageous for popularization to establish systems as common as possible in those standardizations, the standardizations have progressed while mutually exchanging information.

In the communication system and storage system, there already are H. 261 and MPEG1, which are standard systems for motion picture coding whose targets are lower picture quality and lower bit rate. Specifically, the supply of hardware for those standardizations has started. Therefore, one of issues is that a new standard system to achieve higher picture quality should have mutual connectability (compatibility) with those existing standard systems. There are two types of compatibility: forward compatibility which permits a decoder of the new system to decode a bit stream prepared by an encoder of an existing system and backward compatibility which permits a decoder of the existing system to decode a part of a bit stream prepared by an encoder of the new system. In consideration of the fact that the decoder of the existing system has already been defined whereas the decoder of the new system has been undefined, the backward compatibility would be a severe requirement for the coding system.

There may be various systems for ensuring the backward compatibility. As one of those methods that can define the compatibility as an option, a system has been proposed which has a local decoded signal of an existing system included as a candidate for a predictive signal using in the new system and forms a bit stream in such a way that a part of the bit stream by the new system becomes a bit stream by the existing system (which is called embedded coding using hierarchical coding).

Chapter 6 of "International Standardization of Multimedia Coding" (published by Maruzen) describes MPEG1, which is one of the existing systems. In that chapter, the section 6.3 "Coding Algorithm" describes an inter-picture predicting structure which consists of an I picture (intra-prediction picture), P picture (forward prediction picture) and B picture (both forward and backward prediction pictures), with reference to FIG. 6.2. In the description, it is expected that the new system also takes an inter-picture prediction structure similar to that of the existing system. While "image=-picture" is a "frame" in the existing system, such as MPEG1, due to a picture signal having a noninterlaced structure, however, it may become "field" having an interlaced structure in the new system, making the prediction structure slightly complicated.

In the aforementioned embedded coding using hierarchical coding, prediction using a local decoded signal by the existing system is added as an option, and this prediction is selected only when it is better than the prediction originated from a local decoded signal by the new system. In other words, a better one of a local decoded signal from a local decoder of the new system and a local decoded signal that is input via an up-sampling circuit from a local decoder of the existing system is selectively used as a predictive signal in a coding section. It is therefore considered that the coding efficiency will not be deteriorated by the inclusion of the latter prediction from the local decoded signal by the existing system. Conventionally, however, only the prediction error power is considered in the mode discrimination for selecting a predictive signal used in the coding section and that predictive signal which has smaller prediction error power is selected, so that the prediction using the local decoded signal of the existing system is not sufficiently utilized. That is, while the amount of information generated at the time of coding a prediction error signal is reduced, the amount of information as the entire coded output including motion vector information should not necessarily be reduced. This stands in the way of improving the coding efficiency.

For the I picture among individual pictures classified by the prediction structure, the prediction by the existing system is effective and will be selected accordingly, whereas for the P picture and B picture, the prediction originating from a local decoded signal for the coding result by the existing system is not so effective and the chance of its being selected becomes very low. It is known that one cause for this depends on the way of preparing a picture to be coded by the existing system.

Further, according to the conventional embedded coding using the hierarchical coding, in the case where a low-resolution picture is prepared by dropping one field off, the field that has not been used in preparing the low-resolution picture will not be well predicted by a low-resolution predictive signal, thus lowering the entire prediction efficiency.

As described above, according to the conventional embedded coding using the hierarchical coding, since only the prediction error power is considered in the mode discrimination for selecting a predictive signal in the coding by the new system, the prediction using the local decoded signal of the existing system cannot be utilized sufficiently, which stands in the way of improving the coding efficiency.

In addition, according to the conventional embedded coding using the hierarchical coding, for the I picture among individual pictures classified by the prediction structure, the prediction by the existing system is effective and will be selected accordingly, whereas for the P picture and B picture, the prediction originating from a local decoded signal by the existing system is not so effective and the chance of its being selected becomes very low.

It is an object of this invention to provide a motion picture coding apparatus, which will overcome those conventional problems and can improve the coding efficiency by effectively utilizing the predictive ability using a low-resolution local decoded signal in the predictive coding of a high-resolution picture signal.

Disclosure of the Invention

According to this invention, there is provided a motion picture coding apparatus, which performs predictive coding on a high-resolution picture signal, thins out one field for each frame of a picture, down-samples the other field, thereby forming a low-resolution picture, and encodes it, characterized in that a low-resolution predictive signal, obtained by up-sampling a low-resolution local decoded picture and an optimal predictive signal of a high-resolution predictive signal are selected for each field to form a predictive signal, and is used in high-resolution coding.

Further, according to this invention, a motion picture coding apparatus for performing predictive coding on a high-resolution picture signal and coding a low-resolution picture signal obtained by converting the high-resolution picture signal, characterized in that as a determination condition at the time of selecting a predictive signal, used in predictive coding of a high-resolution picture signal, from a high-resolution predictive signal obtained from a high-resolution local decoded signal attained by decoding the result of coding the high-resolution picture signal, and a low-resolution predictive signal obtained from a signal attained by up-sampling a low-resolution local decoded signal originating from the decoding of the result of coding the low-resolution picture signal, prediction error power at the time the high-resolution predictive signal and the low-resolution predictive signal are used in predictive coding of the high-resolution picture signal and the amount of additional information, such as motion vector information, are considered.

Furthermore, this invention is characterized in that there is a mode for performing predictive coding on a high-resolution prediction error signal, which is the difference between a prediction high-resolution picture signal and a high-resolution predictive signal, using a low-resolution prediction error signal, a high-resolution predictive signal undergone motion compensation is produced using a motion vector between a high-resolution local decoded signal and a high-resolution picture signal, a low-resolution predictive signal, undergone motion compensation, is produced from a signal obtained by up-sampling a signal based on which motion compensation in the coding of the low-resolution picture signal is carried out, and the difference between the low-resolution predictive signal and the up-sampled signal of the low-resolution local decoded signal is attained to yield the low-resolution prediction error signal.

At the time of preparing a low-resolution predictive signal, means for shifting a low-resolution local decoded signal and means for determining the shift amount based on the motion vector of the high-resolution picture signal are used.

Even in the case where whether or not to use prediction by the low-resolution picture signal is switched every field and prediction from the low-resolution picture in both fields is not selected due to poor prediction from the low-resolution picture for the prediction of one field according to the prior art, the field which provides better prediction from the low-resolution picture will be selected, thus increasing the entire coding efficiency. Further, the introduction of shift can improve the prediction of that field which has provided poor prediction, further improving the coding efficiency.

According to this invention, as described above, the use of a low-resolution local decoded signal by the existing system becomes effective as a predictive signal not only for an I picture but also for a P picture and a B picture, thus improving the entire coding efficiency.

Also, in a decision for selecting a high-resolution predictive signal and a low-resolution predictive signal, a predictive signal obtained by using a low-resolution local decoded signal based on the existing system is more effectively selected, by taking an amount of additional information such as motion vector information as well as a prediction error power in consideration.

The coding efficiency can be improved by further performing predictive coding on a high-resolution prediction error signal, which has remained because sufficient matching has not been done by the motion compensation of the low-resolution by the new system alone, by using prediction error by the existing system.

Furthermore, according to this invention, there is provided a motion picture coding apparatus for performing predictive coding on a high-resolution picture signal and performing predictive coding of a low-resolution picture signal obtained by converting the high-resolution picture signal, comprising first predicting means for producing a high-resolution predictive signal based on a high-resolution local decoded signal decoded from a signal resulting from predictive coding of the high-resolution picture signal; up-sampling means for up-sampling a low-resolution local decoded signal decoded from a signal resulting from predictive coding of the low-resolution picture; second predicting means for producing a low-resolution predictive signal based on an output signal of the up-sampling means; and third predicting means for producing one of the high-resolution predictive signal, the low-resolution predictive signal and signals obtained by weighting and adding the high-resolution predictive signal and the low-resolution predictive signal, as a predictive signal used when performing predictive coding on the high-resolution picture signal.

The first up-sampling means comprises (a) intra-field interpolation-signal producing means for producing an intra-field interpolation signal consisting only of one field of a signal of the low-resolution local decoded signal, (b) intra-frame interpolation-signal producing means for producing an intra-frame interpolation signal formed of consecutive two fields of signals of the low-resolution local decoded signal, and (c) selecting means for selecting, as the output signal of the up-sampling means, that one signal among the intra-field interpolation signal, the intra-frame interpolation signal and signals obtained by weighting and adding the interpolation signals, which is adaptively determined based on at least one of the high-resolution picture signal and other information necessary for coding.

The second up-sampling means comprises (a) first and second motion-compensation up-sampling means for performing motion-compensation up-sampling on consecutive two fields of the low-resolution local decoded signal, and (b) motion-vector detecting means for detecting a motion vector used in the first and second motion-compensation up-sampling means, referring to the high-resolution picture signal.

The third up-sampling means comprises (a) first and second motion-compensation up-sampling means for performing motion-compensation up-sampling on consecutive two fields of the low-resolution local decoded signal, and (b) vector computing means for computing a motion vector used in the first and second motion-compensation up-sampling means, based on at least one of a motion vector used in predictive coding of the low-resolution picture signal and a motion vector used in predictive coding of the high-resolution picture signal. In this case, the motion vector may be obtained by searching around the computed motion vector as a reference.

According to this invention, there is further provided weighting-coefficient determining means for determining a weighting coefficient used in the weighting and adding in the third predicting means, using at least one of (a) a motion vector used in predictive coding of the low-resolution picture signal, (b) a motion vector used in predictive coding of the high-resolution picture signal, and (c) a motion vector used in motion-compensation up-sampling when the up-sampling means performs the motion-compensation up-sampling.

According to the first up-sampling means, at the time the low-resolution local decoded signal is up-sampled and a low-resolution predictive signal is prepared from the up-sampled signal, adaptive up-sampling according to the motion of a picture can be performed by selectively using one of either the intra-field interpolation signal or intra-frame interpolation signal of the low-resolution local decoded signal, and a signal obtained by weighting and adding those signals, which is adaptively determined based on at least one of the high-resolution picture signal and the other information necessary for coding.

This prevents the efficiency from deteriorating by the turn-around in a motionless area when only the intra-field up-sampling is used, or from deteriorating by time-different signal components entering when only the intra-frame up-sampling is used, thus ensuring efficient prediction in a dynamic area as well as a motionless area. In this case, if the weight for weighting and adding the intra-field interpolation signal and the intra-frame interpolation signal is adaptively determined using a high-resolution picture signal as a reference picture, the optimum weighting coefficient for predicting a high-resolution picture signal will be determined, thus further improving the coding efficiency.

According to the second up-sampling means, at the time the up-sampling of a low-resolution local decoded signal is subjected to motion-compensation up-sampling, the motion vector for motion-compensation up-sampling is determined with a high-resolution picture signal as a reference picture signal, the optimal motion vector for predictive coding of the high-resolution picture signal will be determined, thus improving the coding efficiency.

Further, according to the third up-sampling means, at the time the up-sampling of a low-resolution local decoded signal is subjected to motion-compensation up-sampling, it is not particularly necessary to send the motion vector necessary to the motion-compensation up-sampling by performing computation using the motion vector that is used in the predictive coding of the low-resolution picture signal or the predictive coding of the high-resolution picture signal. In the case where search is conducted around the computed motion vector taken as a reference to obtain a motion vector, the searching range for the motion vector can be narrowed as compared with the case where the motion vector for motion-compensation up-sampling is directly obtained and sent out. Therefore, the amount of motion vector information as well as hardware will be reduced.

BRIEF DESCRIPTION OF DRAWINGS

FIG. 6 is a diagram showing how the amount of shift of low resolution is computed in the embodiment in FIG. 1;

FIGS. 8A and 8B is a diagram showing how to produce a low-resolution picture signal by dropping off one field, and an advantage of performing motion compensation on a low-resolution local decoded signal;

FIG. 13 is a block diagram of a motion picture coding apparatus according to a third embodiment of this invention;

FIG. 14 is a diagram for explaining a predictive coding operation for a high-resolution picture signal in the embodiment in FIG. 13;

FIG. 15 is a block diagram of a motion picture coding apparatus according to a fourth embodiment of this invention;

FIG. 19 is a block diagram showing a first example of a vertical up-sampling circuit portion of the up-sampling circuit in the motion picture coding apparatus in FIG. 15;

FIG. 20 is a block diagram showing a second example of the vertical up-sampling circuit portion of the up-sampling circuit in the motion picture coding apparatus in FIG. 15;

FIG. 21 is a block diagram showing a third example of the vertical up-sampling circuit portion of the up-sampling circuit in the motion picture coding apparatus in FIG. 15;

FIGS. 22A and 22B are diagrams for explaining the operation of the vertical up-sampling circuit portion in FIG. 20;

FIGS. 23A and 23B are diagrams for explaining the operation of the vertical up-sampling circuit portion in FIG. 21;

FIG. 25 is a diagram showing the relation between line positions of a high-resolution picture and a low-resolution picture.

BEST MODE OF CARRYING OUT THE INVENTION

Embodiment of the present invention will now be described referring to the accompanying drawings.

Figure 1:
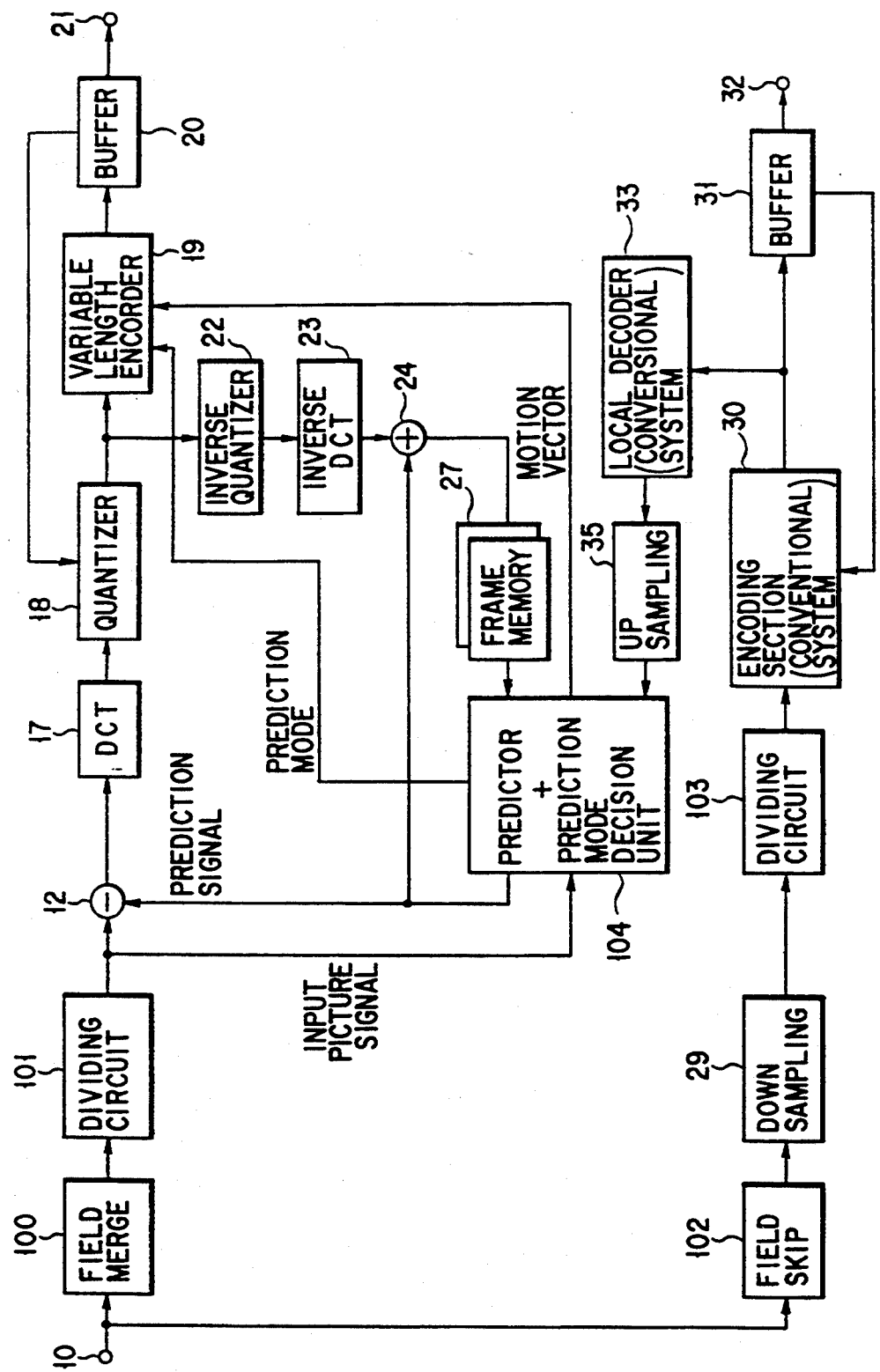
FIG. 1 is a block diagram of a motion picture coding apparatus according to a first embodiment of this invention.

Referring to FIG. 1, a description will be given of an embodiment which inhibits prediction for even fields using a low-resolution local decoded signal, but performs it for odd fields.

This embodiment will be described with reference to the case where a picture to be coded by a new system is an interlaced picture, a picture to be coded by the existing system is a non-interlaced picture prepared by dropping one field from the interlaced picture, and in the coding by the new system, an interlaced picture is coded with frame multiplexing.

In FIG. 1, a terminal 10 where an input picture signal is to be input is connected to a dividing circuit 101 via a field merge circuit 100. The field merge circuit 100 performs field merging of a field picture to treat the field picture of an input picture signal as a frame picture, and the dividing circuit 101 is provided to divide the frame picture into a plurality of blocks. The output of the dividing circuit 101 is connected to one input terminal of a subtracter 12 and a predictor and prediction-mode decision unit 104. The other input terminal of the subtracter 12 is connected to the output terminal of the predictor and prediction-mode decision unit 104. The output terminal of the subtracter 12 is connected to the input terminal of a discrete cosine transform (DCT) circuit 17. The output terminal of the DCT circuit 17 is connected to the input terminal of a variable-length coder 19 via a quantizer 18 which quantizes DCT coefficient data from the DCT circuit 17. The output terminal of the variable-length coder 19 is connected to the input terminal of a buffer memory 20. This buffer memory 20 is connected to the quantizer and an output terminal 21.

The output terminal of the quantizer 18 is connected to one input terminal of an adder 24 via an inverse quantizer 22 and an inverse discrete cosine transform (inverse DCT) circuit 23. The adder 24 adds inverse DCT data and a predictive signal together to produce a high-resolution local decoded signal. The other input terminal of the adder 24 is connected to the output terminal of the predictor and prediction-mode decision unit 104, and the output terminal of the adder 24 is connected to a prediction circuit 134 (FIG. 4) of the predictor and prediction-mode decision unit 104 via a frame memory 27 for storing a high-resolution local decoded signal. A prediction-mode decision unit 135 (FIG. 4) of the predictor and prediction-mode decision unit 104 has its prediction-mode output terminal and a motion-vector output terminal connected to the variable-length coder 19.

The input terminal 10 is connected to the input terminal of a coding section 30 of the existing system via a field skip circuit 102, a down-sampling circuit 29 and a dividing circuit 103 in a serial manner. The output terminal of the coding section 30 is connected to an output terminal 32 via a buffer memory 31 and to the input terminal of a local decoder 33 of the existing system. The output terminal of the local decoder 33 is connected to a low-resolution prediction selector 132 (FIG. 4) of the predictor and prediction-mode decision unit 104 via an up-sampling circuit 35.

The operation of the coding apparatus with the above structure will be described referring to FIGS. 2, 3A and 3B.

Figure 2:
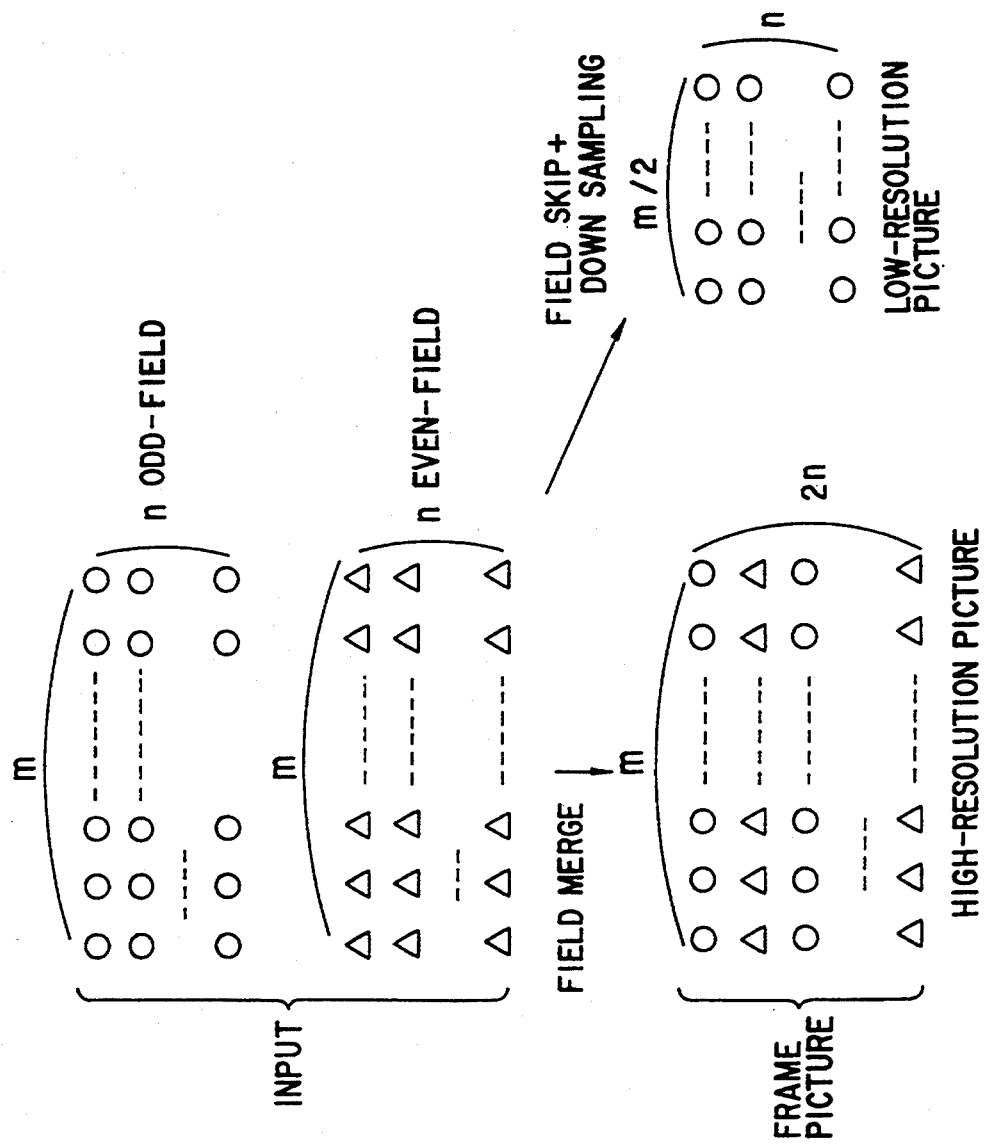
FIG. 2 is a diagram showing the relationship between to-be-coded pictures of various sizes in the embodiment in FIG. 1.

FIG. 2 shows the relationship between to-be-coded pictures of various sizes. FIGS. 3A and 3B show selectable candidates for low-resolution prediction in this embodiment.

A field picture signal of an input picture signal input from the input terminal 10 is subjected to field merging in the field merge circuit 100 to be treated as a signal of a frame picture as shown in FIG. 2. The frame picture signal from the field merge circuit 100 is divided into a plurality of picture blocks by the dividing circuit 101 for coding. Image data subjected to block segmentation after merged to a frame picture is such data that data of an odd field (Odd field) and data of an even field (Even field) appear alternately line by line as indicated on the left end in FIGS. 3A and 3B. In the drawings, data of 4×4 blocks is shown for descriptive simplification, and o indicates data of an odd field and A indicates data of an even field.

When a block of input data (input picture signal) is input to the predictor and prediction-mode decision unit 104, signals for various types of inter-frame prediction (by referring a picture in the frame memory 27) from a high-resolution picture, intra-frame prediction, or prediction from a low-resolution picture (by referring a picture obtained by up-sampling a picture in the frame memory in the local decoder 33 of the existing system by the up-sampling circuit 35) considered as prediction candidates are produced, and differences between these signals and the input signal are obtained. A prediction mode to minimize the difference is selected based on a certain evaluation criterion. For the prediction from the high-resolution picture whose detailed description will be omitted because it is not concerned with the subject matter of this invention, but, for example, a system currently considered in MPEG2.

Figure 3:
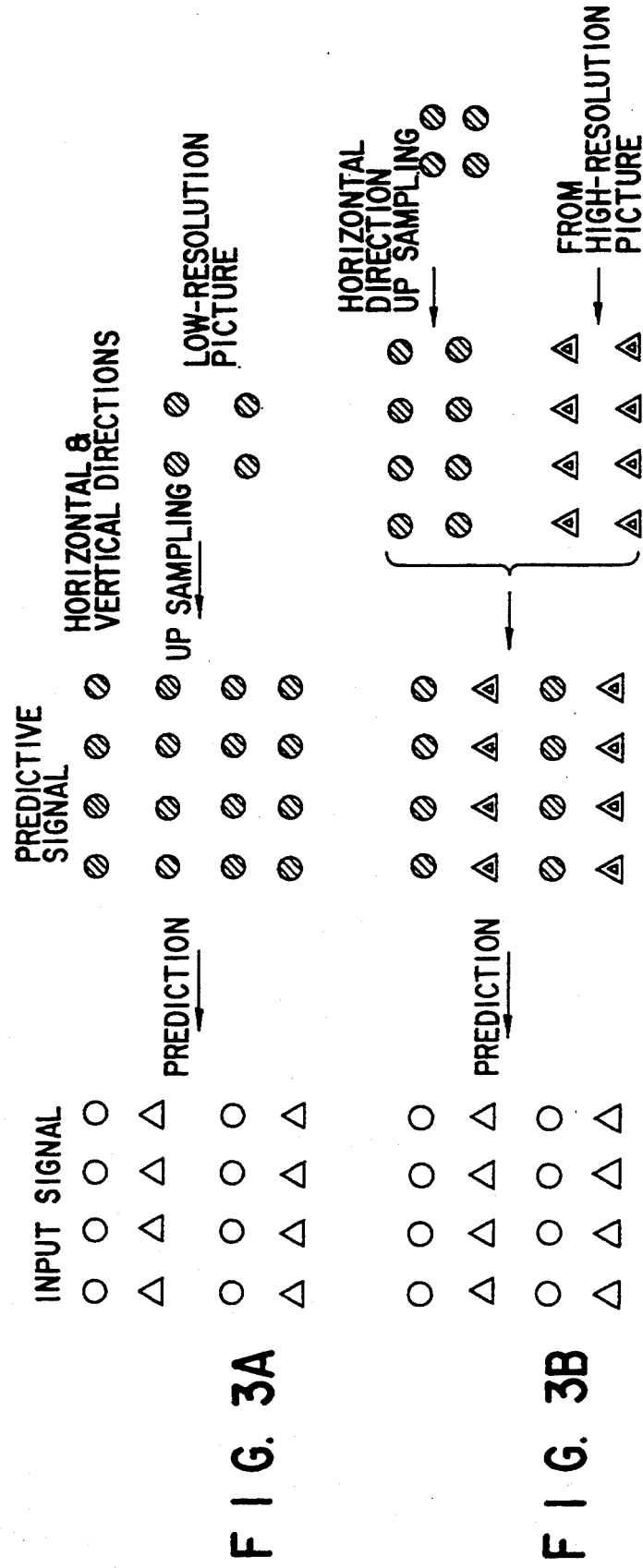
FIGS. 3A and 3B presents diagrams showing selectable candidates for low-resolution prediction in the embodiment in FIG. 1.

In this invention, besides the system of producing a prediction picture from a low-resolution picture together with an odd line and an even line as shown in FIG. 3A, there is a system of producing a prediction picture from a low-resolution picture for odd lines and a prediction picture from a high-resolution picture for even lines and the reverse combination as shown in FIG. 3B (in the diagram,   indicates a low-resolution predictive signal). To produce those signals, the predictor and prediction-mode decision unit 104 separates the input signal to odd lines and even lines, and obtains an optimal signal (double triangle in FIG. 3B) from all available signals as a high-resolution predictive signal for each line. Then, pixels at a position corresponding to the current coding block in the frame memory in the local decoder 33 of the existing system are read out, and up-sampled by the up-sampling circuit 35. Finally, those pixels are alternately merged line by line to be a predictive signal. A predictive signal only from a low-resolution picture is produced by up-sampling a picture in the frame memory of the existing system.

Further, matching is separately performed on the pixels o and Δ of the input picture while shifting pixels in the picture obtained by up-sampling a low-resolution picture to find the optimal amounts of shift. A signal merged line by line alternately with those pixels and a signal merged line by line with the predictive signal of a high-resolution picture are produced in a similar manner.

In either case, three candidates are produced for a low-resolution predictive signal ((1) odd: low resolution, even: high resolution; (2) odd: high resolution, even: low resolution; (3) low resolution for both odd and even). The predictor and prediction-mode decision unit 104 selects a candidate, which optimizes the prediction error, from among those three candidates from the low-resolution predictive signal and candidates from the high-resolution predictive signal, gives the optimal candidate as a predictive signal to the subtracter 12 and sends a prediction mode to the variable-length coder 19. The prediction mode is subjected to variable-length coding as type information and multiplexed for each prediction unit (e.g., a macroblock for MPEG). In this embodiment, different type information are assigned to all the candidates for the predictive signal.

Another embodiment is to indicate by 1-bit flag whether or not prediction from a low-resolution picture is to be included.

Figure 4:
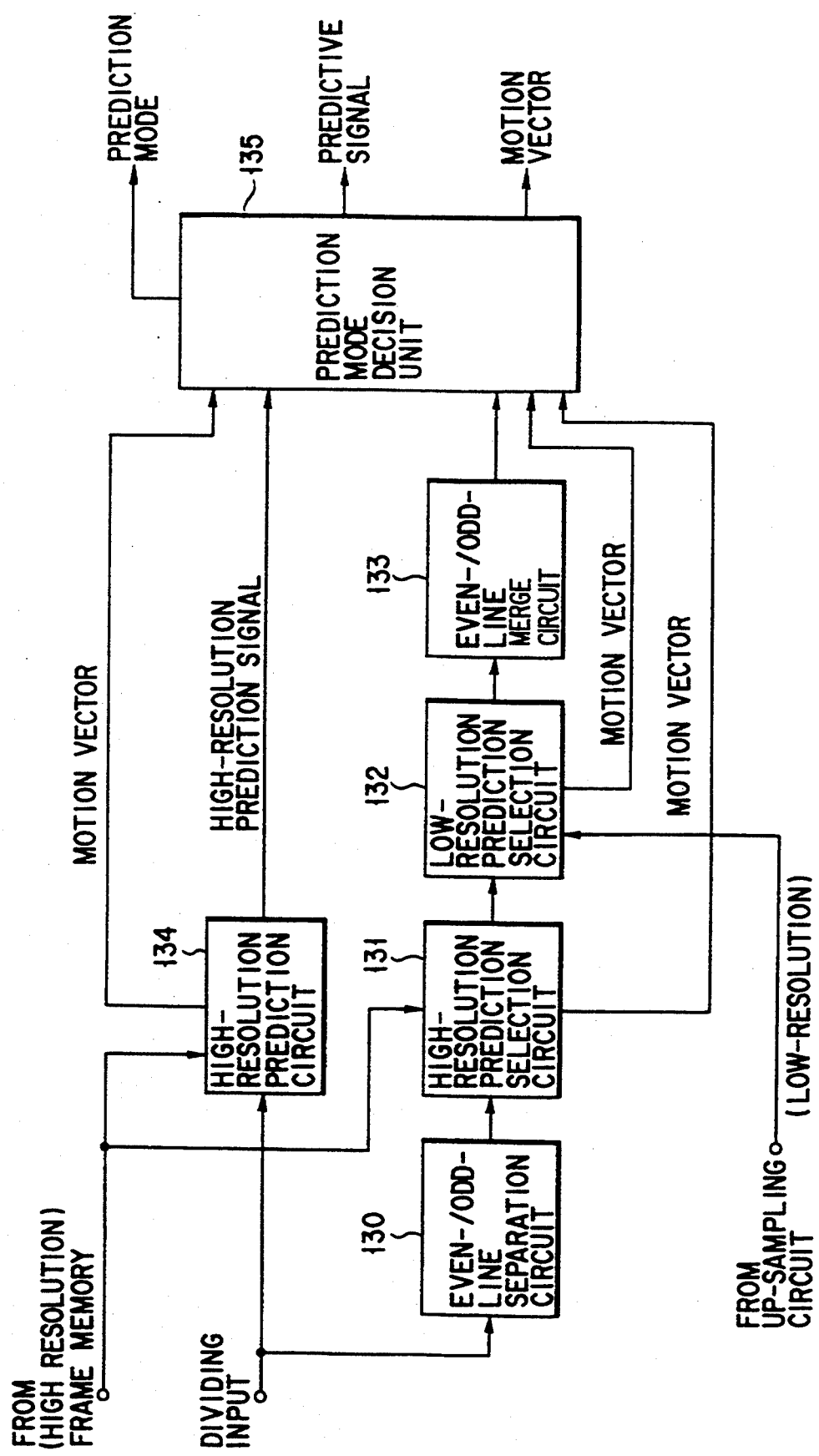
FIG. 4 is a diagram showing the structure of a predictor and prediction-mode decision circuit in the embodiment in FIG. 1.

FIG. 4 is a block diagram showing an example of the structure of the predictor and prediction-mode decision unit 104 in FIG. 1, and its operation will be described in association with the description of FIGS. 3A and 3B. First, an input block is separated to lines of pixels o and Δ by an even/odd numbered line separator 130, an optimal predictive signal (double triangle) is obtained from a high-resolution picture for each field by a high-resolution prediction selector 131, and a motion vector corresponding to the optimal predictive signal is sent to prediction-mode decision unit 135. Then, an optimal predictive signal Δ is obtained from a low-resolution picture for each field by the low-resolution prediction selector 132, and a motion vector corresponding to the optimal predictive signal is sent, when necessary, to prediction-mode decision unit 135.

An even/odd numbered line merge circuit 133 executes three types of merging from a combination of the above, yielding a predictive signal corresponding to FIGS. 3A and 3B, and this signal is sent to the prediction-mode decision unit 135. The high-resolution prediction circuit 134 prepares a high-resolution predictive signal other than the sent predictive signal (e.g., a signal corresponding to prediction that is currently under consideration in MPEG2), and it is sent together with a corresponding motion vector to the prediction-mode decision unit 135. The prediction-mode decision unit 135 selects a predictive signal, which minimizes the prediction error, from among all the received predictive signals, and sends it to the subtracter 12. The prediction-mode decision unit 135 also selects a motion vector, which minimizes the prediction error, from among all the received motion vectors, and sends it to the variable-length coder 19.

The optimal shift amount detected for a low-resolution picture may be subjected as motion vector information to variable-length coding in the variable-length coder 19 as separate from the motion vector information of the high-resolution picture, and may be multiplexed before transmission. As there is a low possibility of selecting a mode for predicting only that field dropped out by the field skipping from a low-resolution signal, this mode may be eliminated from selective targets in this embodiment. Further, the shifting may be restricted to the prediction of only the field dropped out by the field skipping.

Another embodiment of this invention will be described below.

Figure 5:
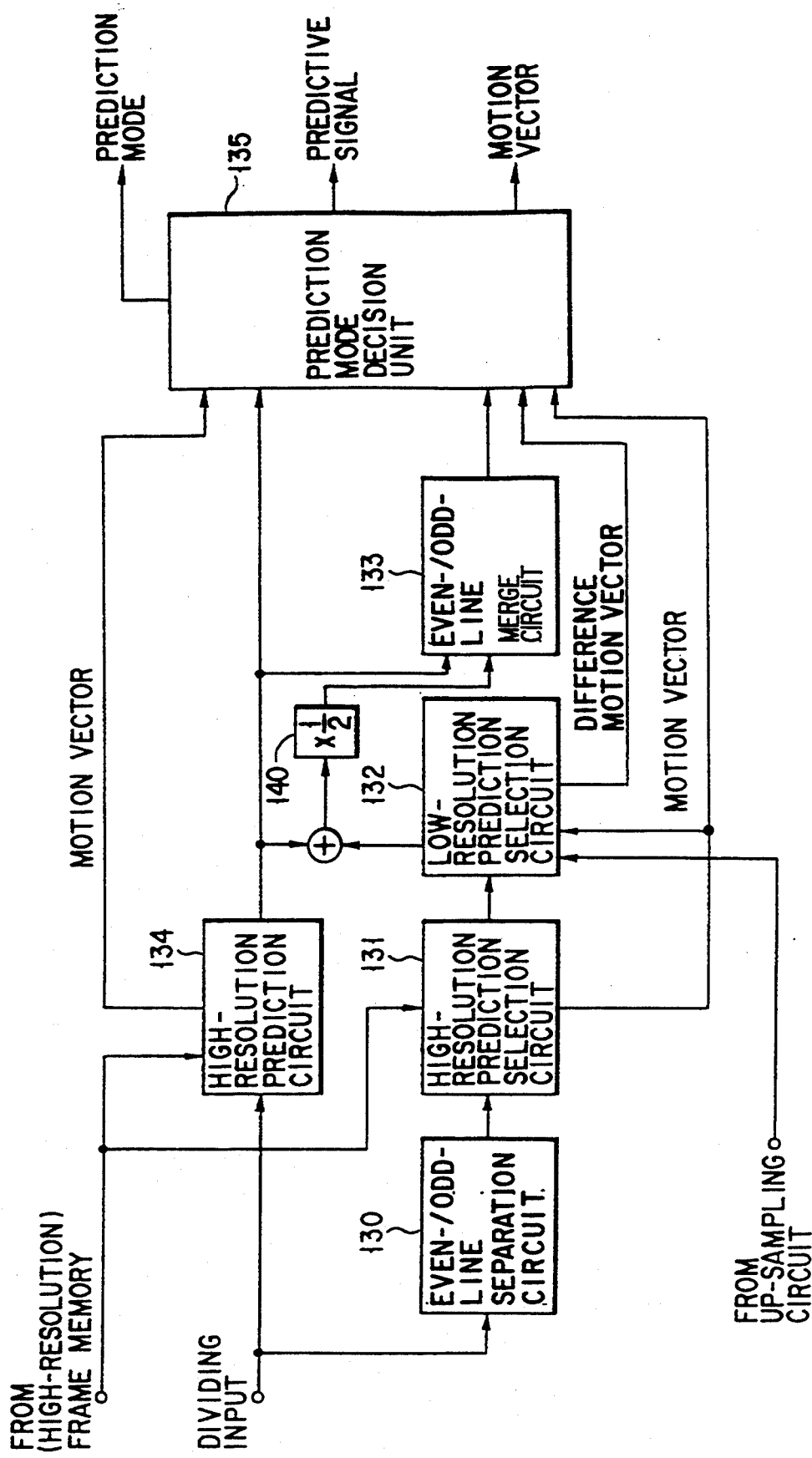
FIG. 5 is a diagram showing another structure of the predictor and prediction-mode decision circuit in the embodiment in FIG. 1.

FIG. 5 is a diagram showing the structure of the predictor and prediction-mode decision circuit in this embodiment; same reference numerals as used in FIG. 4 are used for same portions.

First, candidates for a high-resolution predictive signal are produced by the high-resolution prediction circuit 134 as in the embodiment shown in FIG. 4. They include the detection of forward and backward motion vectors. An input is separated into even and odd lines by the even/odd line separator 130, and an optimal high-resolution picture in the case where prediction is performed with a high-resolution picture for each field is selected by the high-resolution prediction selector 131. This embodiment differs from the above-described embodiment in the way of producing a low-resolution predictive signal, which is selected by the low-resolution prediction selector 132 and used for prediction of that field dropped out by the field skipping. Motion vector detection is performed and a low-resolution predictive signal is prepared using motion compensation in the above-described embodiment, whereas a low-resolution predictive signal is prepared using a motion vector which is derived by scaling the motion vector obtained for a candidate for high-resolution prediction down to that corresponding to one field time interval. This will be described referring to FIG. 6. Using a motion vector given as a candidate for high-resolution prediction for the prediction of an even field, for example, a vector V1 in the diagram (indicated by a broken line in the diagram), the vector of a motion vector V1' for low-resolution prediction (indicated by a thick line in the diagram) will be obtained. When an even field to be predicted is apart from that field which is used for prediction by n fields, as illustrated, the motion vector is given by $$V1' = v1/n \tag{1}$$

Since this motion vector is directly used for low-resolution prediction in this embodiment, it is unnecessary to send the motion vector for low-resolution prediction.

Here, search is conducted in the determined search area around this motion vector to obtain an optimal motion vector again for low-resolution prediction. In this example, if the optimal motion vector is a vector V1", the difference between this vector V1" and the reference vector V1'

$$\Delta V = V1'' - V1' \tag{2}$$

is sent as a difference vector.

The candidate for the predictive signal prepared on the low-resolution side and the candidate for the predictive signal on the high-resolution side are averaged by an averaging circuit 140, and are merged by the even-/odd line merge circuit 133 to be candidates for a low-resolution predictive signal. From among those candidates and the candidates from the high-resolution predictive signal, a predictive signal candidate which minimizes the prediction error is selected by the prediction-mode decision unit 135.

According to this embodiment, as the motion vector of a low-resolution picture is prepared from the motion vector for a high-resolution picture, both should correspond to each other. In other words, the vector V1' is used on the low-resolution side when a candidate for which the vector V1, for example, in FIG. 6 is used is selected, and the vector V2' is used on the low-resolution side when a candidate for which the vector V2 is used is selected. There are three ways of prediction on the high-resolution side: forward direction, backward direction and bidirectional. In the bidirectional case, a motion vector on the field side closer to a to-be-predicted field has only to be used.

Figure 7:
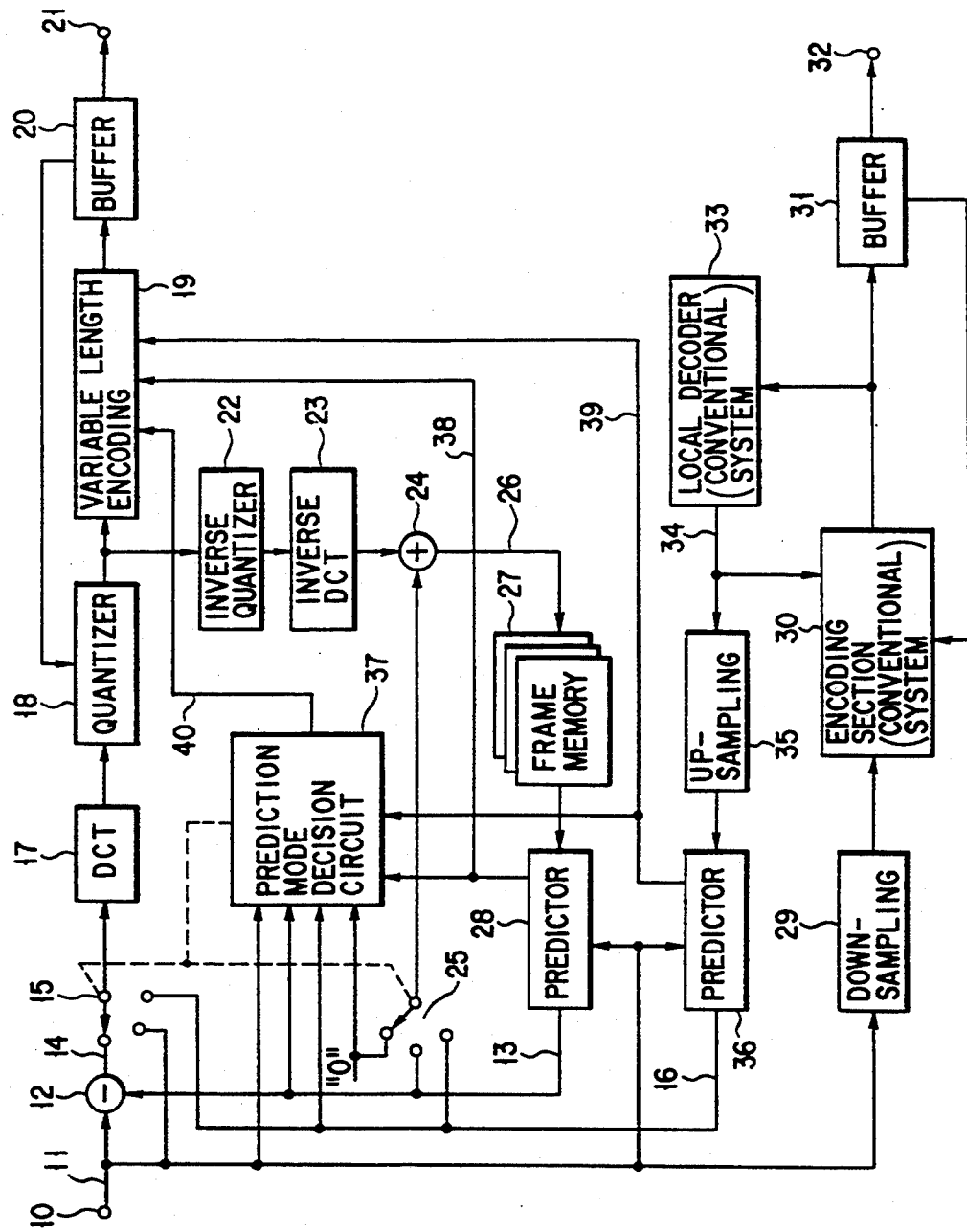
FIG. 7 is a block diagram of a motion picture coding apparatus according to a second embodiment of this invention.

FIG. 7 is a block diagram of a motion picture coding apparatus according to the second embodiment of this invention. This embodiment will be described with reference to the case where a picture to be coded by the new system is an interlaced picture, a picture to be coded by the existing system is a non-interlaced picture prepared by dropping one field from the interlaced picture.

In FIG. 7, a high-resolution picture signal is input as an input picture signal 11 to a terminal 10. This input picture signal 11 is input to a subtracter 12 where the difference between this signal and a high-resolution predictive signal 13 is obtained, yielding a high-resolution prediction error signal 14. A first selector switch 15 selects one of the input picture signal 11, the high-resolution prediction error signal 14 and a low-resolution predictive signal 16 under the control of a prediction-mode decision circuit 37.

The signal selected by the selector switch 15 is subjected to DCT coding in a DCT (Discrete Cosine Transform) circuit 17. DCT coefficient data obtained by the DCT circuit 17 is quantized by an quantizer 18. The signal quantized by the quantizer 18 is sent to two ways; one is subjected to variable-length coding in a variable-length coder 19 and is then sent via a buffer 20 to a transmission system or a storage system at a predetermined bit rate from an output terminal 21. The subtracter 12, DCT circuit 17, quantizer 18 and variable-length coder 19 constitute the first coding means.

The other one of the signal quantized by the quantizer 18 and branched to two ways is sequentially subjected to opposite processes to those of the quantizer 18 and DCT circuit 17 in an inverse quantizer 22 and an inverse DCT circuit 23, and is then added to a signal selected by a second selector switch 25 in an adder 24, yielding a high-resolution local decoded signal 26. The inverse quantizer 22, inverse DCT circuit 23 and adder 24 constitute the first local decoding means.

The selector switch 25 is controlled, interlocked with the selector switch 15, by the prediction-mode decision circuit 37, and selects "0" when the selector switch 15 selects the input picture signal 11, the high-resolution predictive signal 13 when the switch 15 selects the high-resolution prediction error signal 14, and selects the low-resolution predictive signal 16 when the switch 15 selects the low-resolution predictive signal 16.

The high-resolution local decoded signal 26 output from the adder 24 is written in a frame memory 27 having a memory capacity for a plurality of frames. The output of the frame memory 27 is input to a predictor 28 and is used to prepare the high-resolution predictive signal 13. The predictor 28 detects a motion vector between the input picture signal 11, which is a high-resolution picture signal, and the high-resolution local decoded signal from the frame memory 27, and performs motion compensation inter-frame (inter-field) prediction using this motion vector to produce the high-resolution predictive signal 13 and outputs motion vector information 38. The predictive signal thus obtained includes three ways of prediction, namely the forward prediction, the backward prediction and the bidirectional prediction, as described in the aforementioned document, and optimal prediction among those will be selected.

The input picture signal 11 is also input to a down-sampling circuit 29, which is means for converting a high-resolution picture signal to a low-resolution picture signal, and is down-sampled there to be converted into a low-resolution picture signal of a format, such as CIF or SIF. An example of the process in the down-sampling circuit 29 is down-sampling by dropping one field off as shown in FIG. 8A. A low-resolution picture signal indicated by a small rectangle is prepared by dropping off an even field of a high-resolution picture signal indicated by an elongated, large rectangle and sub-sampling an odd field in the horizontal direction after putting it through a low pass filter for removing horizontal turn-around.

The low-resolution picture signal of the CIF or SIF format obtained by the down-sampling circuit 29 is coded by a coding section 30 based on the existing system (e.g., H. 261 or MPEG1), which is the second coding means, and is then sent via a buffer 31 to the transmission system or storage system at a predetermined bit rate from an output terminal 32. The coded output from the coding section 30 is subjected to local decoding by a local decoder 33 based on the existing system (H261 or MPEG1), which is the second local decoding means. A low-resolution local decoded signal 34 output from the local decoder 33 is input to the coding section 30 to prepare a predictive signal which is used in predictive coding in the coding section 30, and is up-sampled by an up-sampling circuit 35 to be also used to prepare the low-resolution predictive signal 16 in a second predictor 36.

The predictor 36 detects a motion vector between the input picture signal 11, which is a high-resolution picture signal, and a signal obtained by up-sampling a low-resolution local decoded signal in the up-sampling circuit 35, and performs motion compensation on the up-sampled signal of the low-resolution local decoded signal using this motion vector to produce the low-resolution predictive signal 16, and outputs motion vector information 39.

Referring to FIG. 8B, a description will now be given of the advantage of performing motion compensation on the low-resolution local decoded signal in the predictor 36. If the low-resolution picture signal prepared by down-sampling the picture signal as shown in FIG. 8A is put through the coding section 30 and the local decoder 33 to produce the low-resolution local decoded signal 34 and this signal 34 is up-sampled in the up-sampling circuit 35, when used to predict an odd field, it ensures good prediction because it positionally matches with the original odd field. When it is used to predict an even field, however, good prediction is not possible for an area where there is motion due to a mutual time shift. If the up-sampled signal of the low-resolution local decoded signal is shifted by a shift amount corresponding to the motion in the field period as shown in FIGS. 8A and 8B, however, the signal positionally matches with an even field, making it possible to perform accurate prediction using the shifted low-resolution local decoded signal. In this case, therefore, the motion compensation by the predictor 36 basically need to be performed only at the time of predicting an even field. As the execution of motion compensation reduces a prediction error in an odd field, however, the motion compensation may be performed with respect to both fields.

The prediction-mode decision circuit 37 determines a prediction mode at the time of coding the input picture signal 11, and controls the selector switches 15 and 25 in accordance with the decision result. The prediction-mode decision circuit 37 outputs a prediction mode signal 40 that indicates which prediction mode has been selected. The prediction mode signal 40 is input to the variable-length coder 19 to be subjected to variable-length coding together with the quantized signal from the quantizer 18 and motion vector information 38 and 39 output from the predictors 28 and 36.

Figure 9:
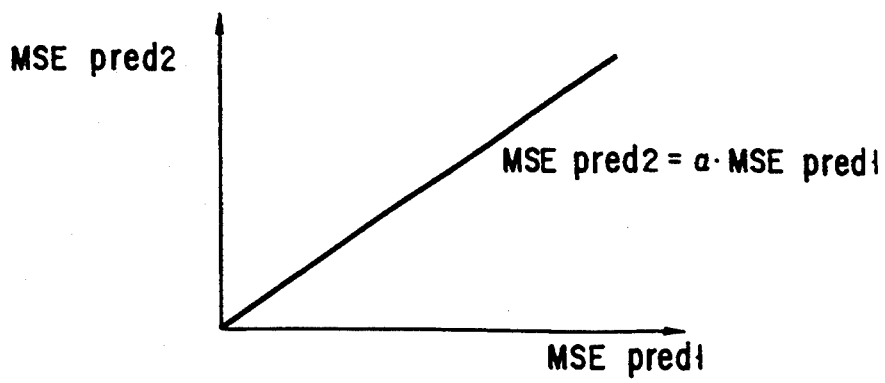
FIG. 9 is a diagram showing a decision function at the time of selecting a low-resolution predictive signal and a high-resolution predictive signal in a prediction-mode decision circuit in FIG. 7.

FIG. 9 shows a function for determining which one is to be selected in the prediction-mode decision circuit 37, the high-resolution predictive signal 13 from the predictor 28 or the low-resolution predictive signal 16 from the predictor 36. With the high-resolution predictive signal 13 in use, information of one or two motion vectors should be sent as the motion vector information 38. With the low-resolution predictive signal 16 in use, however, information of zero or one motion vector (one or two in the case where motion compensation from a low-resolution picture signal is to be also performed with respect to an odd field) has only to be sent as the motion vector information 39.

As mentioned above, the motion vector information 38 and 39 are transmitted after being subjected to variable-length coding in the variable-length coder 19. The numbers of bits (the bit amounts of variable-length codes) used in sending those motion vector information 38 and 39 is estimated and the difference therebetween is denoted by $MV_{bitdiff}$. Now, let us consider requantization of the prediction error signal of the low-resolution picture signal with this number of bits.

Given that $MSE_{pred1}$ indicates the prediction error power of the predictive signal 14 when the high-resolution predictive signal 13 from the predictor 28 is used and $MSE_{pred2}$ indicates the prediction error power of the predictive signal 14 when the low-resolution predictive signal 16 from the predictor 36 is used, $MSE_{pred1}$ and $MSE_{pred\,2} \times 2^{-2MVbitdiff}$ is compared. When the result of the comparison decision is $$MSE_{pred1} < MSE_{pred2} \times 2^{-2Mvbitdiff} \qquad (3),$$

the high-resolution predictive signal 13 is selected by the selector switches 15 and 25, and when $$MSE_{pred1} > MSE_{pred2} \times 2^{-2Mvbitdiff} \qquad (4),$$

the low-resolution predictive signal 16 is selected by the selector switches 15 and 25. Then, the optimal predictive coding of the input picture signal 11 becomes possible while suppressing the amount of information to be sent. This is particularly effective in the case where it is unnecessary to send motion vector with respect to the low-resolution predictive signal 16, e.g., when the low-resolution predictive signal 16 is prepared from a frame formed with merged fields.

The decision function $\alpha$ in FIG. 9 may be a function where $\alpha = 2^{-2Mvbitdiff}$, that is, a function whose inclination is changed by $Mv_{bitdiff}$. This function can likewise used to compare predictive signals of a high-resolution picture with each other.

Figure 10:
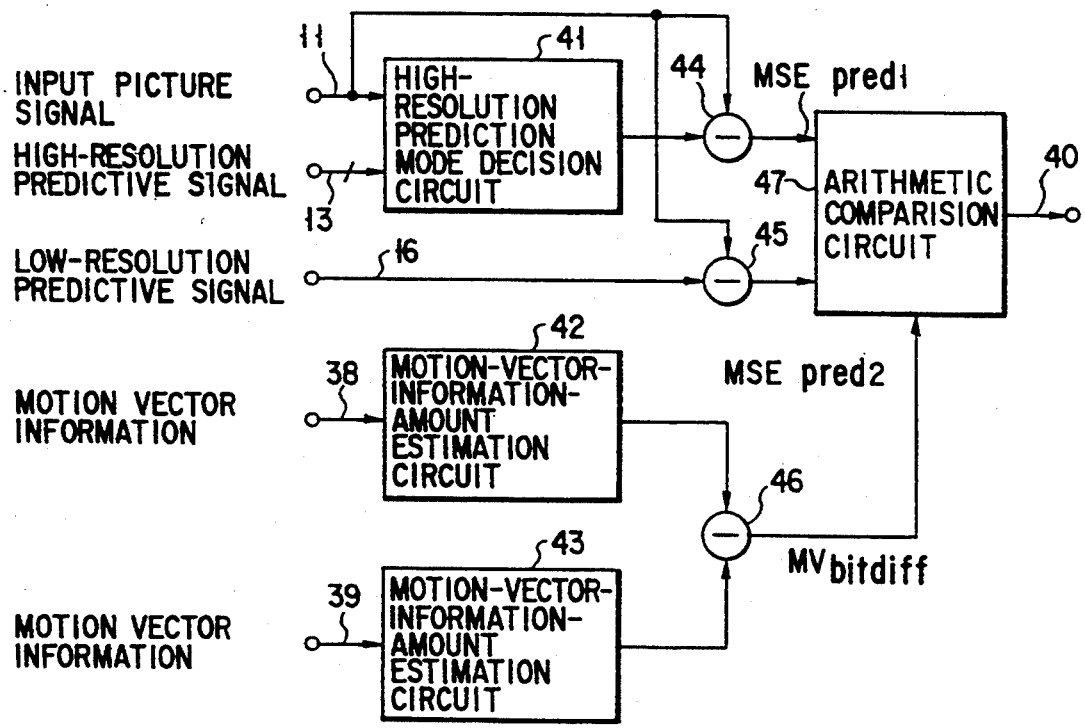
FIG. 10 is a block diagram showing an example of the structure of the prediction-mode decision circuit in FIG. 7.

FIG. 10 is a block diagram showing a specific example of the structure of the prediction-mode decision circuit 37 shown in FIG. 7 based on the above-described principle. The input picture signal (high-resolution picture signal) 11 and the high-resolution predictive signals 13 from the predictor 28 are input to a high-resolution prediction-mode decision circuit 41 where one of the high-resolution predictive signals 13 is selected. The difference between the selected high-resolution predictive signal and the input picture signal 11 is obtained by a subtracter 44, yielding a high-resolution prediction error signal. The low-resolution predictive signal 16 from the predictor 36 is input to a subtracter 45, which obtains the difference between this signal and the input picture signal 11, yielding a low-resolution prediction error signal. The motion vector information 38 and 39 from the predictors 28 and 36 are input to motion-vector information amount estimating circuits 42 and 43 to estimate the amounts of motion-vector information or the amounts of generated information from the variable-length coder 19 which correspond to the motion vector 38 and 39. A subtracter 46 obtains the difference between the estimated amounts of motion-vector information or the aforementioned MVbitdiff.

An operation/decision circuit 47 obtains prediction error powers $MSE_{pred1}$ and $MSE_{pred2}$ of the high-resolution predictive signal and low-resolution predictive signal, and performs decision given by the equations (3) and (4) from the difference $Mv_{bittdiff}$ between the two amounts of motion-vector information, using the decision function shown in FIG. 9. In accordance with the decision result, the circuit 47 controls the selector switches 15 and 25 in FIG. 7 and outputs the prediction mode signal 40.

According to the embodiment in FIG. 7, as described above, under the decision criterion where additional information, such as motion-vector information, as well as the prediction error power is considered with respect to both the high-resolution prediction error signal and the low-resolution prediction error signal, the predictive signal to be used in predictive coding of the high-resolution input picture signal is selected, thus advantageously improving the coding efficiency.

The above embodiment may be worked out in various modifications as follows.

(1) Although a low-resolution picture signal is prepared from an odd field, preceding by time, by dropping off one field in FIG. 8A, it may be prepared from an even field. Accordingly, with regard to the prediction of an odd field, the prediction from the low-resolution local decoded signal is backward prediction, so that further improvement on the prediction efficiency will be expected.

Figure 11:
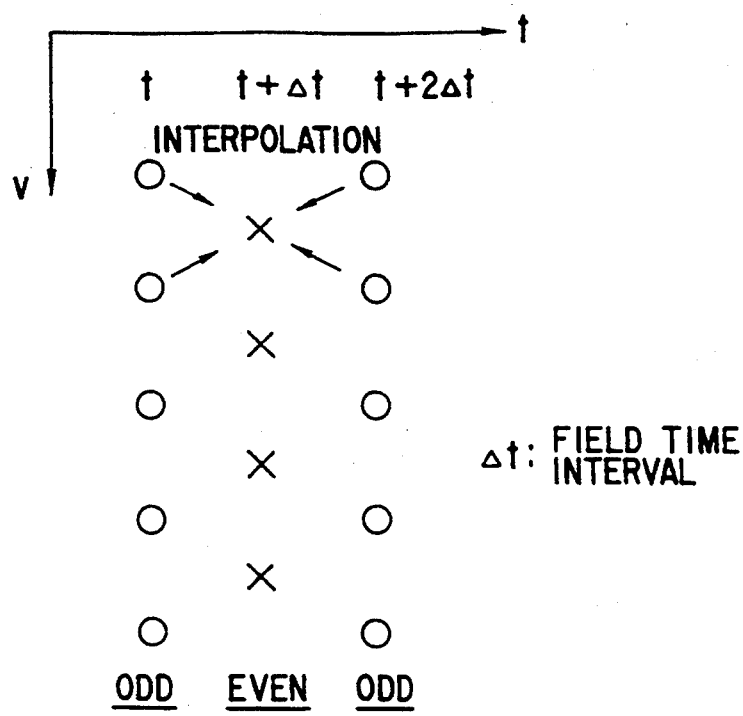
FIG. 11 is a diagram showing another method of producing a signal for predicting one field which has been dropped off when a low-resolution picture signal has been prepared by dropping off one field.

(2) The low-resolution predictive signal for the prediction of an even field may also be obtained by spatial-temporal interpolation as shown in FIG. 11, not by motion compensation prediction. More specifically, the individual pixels of a low-resolution prediction new word of an even field are interpolated with a signal of those pixels of an odd field which are adjacent along the time axis t of the low-resolution local decoded signal and also along the spatial axis (vertical direction) V. In this case, it is unnecessary to transmit motion-vector information corresponding to the low-resolution picture signal, thus improving the coding efficiency.

(3) In the case of performing motion compensation on an even field too, the motion vector in use can be estimated from a previous motion vector or the motion vector used for coding a low-resolution picture. In this case too, it is unnecessary to transmit motion-vector information corresponding to the low-resolution picture signal.

Figure 12:
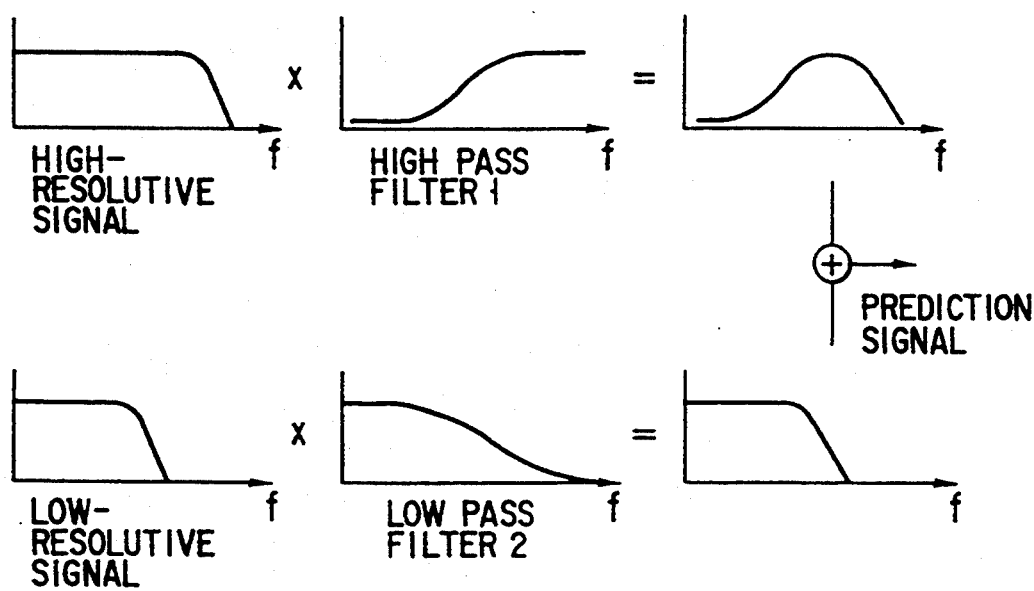
FIG. 12 is a diagram for explaining a method of using both of a low-resolution picture signal and a high-resolution picture signal in prediction.

(4) A function to produce a predictive signal using both the high-resolution local decoded signal and the low-resolution local decoded signal may be added to the predictor 28. In this case, as shown in FIG. 12, the high-resolution signal (high-resolution local decoded signal) and the low-resolution signal (low-resolution local decoded signal) are filtered by a high-pass filter 1 and a low-pass filter 2 whose passbands have a mutually complementary relation, and are then added to form a predictive signal. The low-frequency component of the thus obtained predictive signal is produced from a low-resolution predictive signal closer in terms of time, and the high-frequency component is produced from the high-resolution picture, so that the improvement on the prediction efficiency is expected. Further, the addition of the two local decoded signals will reduce quantized noise.

(5) At the time of detecting a motion vector between the input picture signal 11 (high-resolution picture signal) and the high-resolution local decoded signal in the predictor 28, the amount of computation can be reduced by limiting the search range to around that motion vector which is the motion vector between the low-resolution picture signals, obtained by the coding section 30, enlarged to a motion vector corresponding to the high-resolution picture.

A motion picture coding apparatus according to the third embodiment of this invention will now be described referring to FIG. 13. In this embodiment, four selector switches 51, 54, 55 and 56 for selection of a prediction mode are provided, and those switches are controlled by a prediction-mode decision circuit 37. The prediction-mode decision circuit 37 may have the structure as shown in FIG. 10, or may have the same structure as the prior art. The selector switch 51 selects either an input picture signal 11 or a high-resolution low-resolution 14 output from a subtracter 12. The selector switch 54 selects either a signal 52 selected by the selector switch 51 or a low-resolution prediction error signal from a subtracter 53 (a difference signal between the signal 52 and a low-resolution predictive signal 16). The signal selected by this selector switch 54 is input to a DCT circuit 17.

The selector switch 55 is controlled, interlocked with the selector switch 51, by the prediction-mode decision circuit 37, and selects "0" when the selector switch 51 selects the input picture signal 11, and the high-resolution predictive signal 13 when the switch 51 selects the high-resolution prediction error signal 14. Likewise, the selector switch 56 is controlled, interlocked with the selector switch 54, by the prediction-mode decision circuit 37, and selects "0" when the selector switch 54 selects the signal from the selector switch 51, and the low-resolution predictive signal 16 when the switch 54 selects the low-resolution prediction error signal.

The signal selected by the selector switch 55 is added to a signal from an inverse DCT circuit 23 in an adder 24a, and the signal selected by the selector switch 56 is added to a signal output from the adder 24a in an adder 24b, thus producing a local decoded signal 26.

As in the embodiment of FIG. 7, a predictor 28 detects a motion vector between the input picture signal 11, which is a high-resolution picture signal, and the high-resolution local decoded signal from a frame memory 27, and performs motion compensation inter-frame (inter-field) prediction using this motion vector to produce the high-resolution predictive signal 13 and outputs motion vector information 38. The predictive signal thus obtained includes three ways of prediction, namely the forward prediction, the backward prediction and the bidirectional prediction, and optimal prediction among those will be selected.

The motion vector information 38 obtained by the predictor 28 is sent to a predictor 36 as well as to a variable-length coder 19. The predictor 36 accesses a frame memory 57, which stores plural frames of low-resolution local decoded signals from a local decoder 33, performs motion compensation on a signal input via an up-sampling circuit 35 from the frame memory 57 based on the motion vector information sent from the predictor 28, using the same method as the predictive signal preparing method selected by the predictor 28, and outputs the motion-compensated low-resolution predictive signal 16.

FIG. 14 is a diagram showing how predictive coding of a high-resolution picture signal is carried out in this embodiment. The predictor 28 outputs the high-resolution predictive signal 13, obtained by performing motion compensation on a high-resolution picture signal (high-resolution local decoded signal) at t=t1, and the subtracter 12 outputs the high-resolution prediction error signal 14, which is the difference between the high-resolution predictive signal 13 and the high-resolution picture signal 11 at t=t0. The predictor 36 outputs a low-resolution prediction error signal, which is the difference between a low-resolution predictive signal, which is obtained by performing motion compensation on a low-resolution picture signal (low-resolution local decoded signal) at t=t1, and a low-resolution local decoded signal at t=t0, as the low-resolution predictive signal 16. This low-resolution predictive signal 16 is supplied to the subtracter 53 as a predictive signal for inter-frame (or inter-field) predictive coding on the high-resolution prediction error signal 14.

According to the embodiment in FIG. 13, as described above, there is a mode for further performing predictive coding of the high-resolution prediction error signal 14 using the low-resolution prediction error signal as a predictive signal, so that the local decoded signal by the existing system can be used more effectively in the predictive coding of the high-resolution picture signal, thus improving the coding efficiency, which is an advantage.

According to the above embodiment, it is possible to effectively use the prediction ability using a low-resolution local decoded signal in the predictive coding of a high-resolution picture signal in the motion picture coding apparatus of an embedded coding system using hierarchical coding, thus improvising the coding efficiency.

Now, a motion picture coding apparatus according to a fourth embodiment of this invention will be described referring to FIG. 15.

In FIG. 15, a high-resolution picture signal, e.g., an HDTV signal, is input as an input picture signal 11 to a terminal 10. This input high-resolution picture signal 11 is input to a subtracter 12 where the difference between this signal and a predictive signal 13 is obtained, yielding a prediction error signal 14.

A first selector switch 15 selects either the input high-resolution picture signal 11 or the prediction error signal 14. The signal selected by the selector switch 15 is subjected to DCT in a DCT (Discrete Cosine Transform) circuit 17. DCT coefficient data obtained by the DCT circuit 17 is quantized by an quantizer 18. The signal quantized by the quantizer 18 is sent to two ways; one is subjected to variable-length coding in a variable-length coder 19 and is then sent via a buffer 20 to a transmission system or a storage system (not shown) at a predetermined bit rate from an output terminal 21.

The subtracter 12, selector switch 15, DCT circuit 17, quantizer 18 and variable-length coder 19 constitute a high-resolution picture coding circuit based on a motion-compensation adaptive predictive coding system.

The other one of the signal quantized by the quantizer 18 and branched to two ways is sequentially subjected to opposite processes to those of the quantizer 18 and DCT circuit 17 in an inverse quantizer 22 and an inverse DCT circuit 23, and is then added to the predictive signal 13 in an adder 24. The second selector switch 25 is controlled, interlocked with the selector switch 15, and selects the output of the inverse DCT circuit 23 when the first selector switch 15 selects the input high-resolution picture signal 11, and the output of the adder 24 when the first selector switch 15 selects the prediction error signal 14, thereby producing a high-resolution local decoded signal 26.

The inverse quantizer 22, inverse DCT circuit 23, adder 24 and second selector switch 25 constitute a high-resolution local decoding circuit.

The high-resolution local decoded signal 26 is written in a frame memory 27. The output of the frame memory 27 is input to a first predictor 28 and is used to prepare a high-resolution predictive signal 40. The first predictor 28 detects a motion vector between the input high-resolution picture signal 11, which is a high-resolution picture signal, and the high-resolution local decoded signal from the frame memory 27, and performs motion compensation inter-frame (or inter-field) prediction using this motion vector to produce the high-resolution predictive signal 40 and outputs motion vector information 38.

The prediction system in the first predictor 28 may be a method for adaptively switching between inter-frame prediction and inter-field prediction, or may be a system as described in the document "One Method of Adaptive Motion Compensation prediction for Interlaced Image" by Otaka, Yamakage and Yamaguchi, Picture Coding Symposium 1992 (PCSJ92), 5-13.

The input high-resolution picture signal 11 is also input to a down-sampling circuit 29, which is means for converting a high-resolution picture signal to a low-resolution picture signal, and is down-sampled there to be converted into a low-resolution picture signal of a format defined by, for example, CCIR. Rec. 601. This low-resolution picture signal is a signal which, like the high-resolution picture signal, has been subjected to interlace scanning. The vertical pixel positions of the high-resolution picture signal and low-resolution picture signal have a relationship as shown in FIG. 25.

Figure 16:
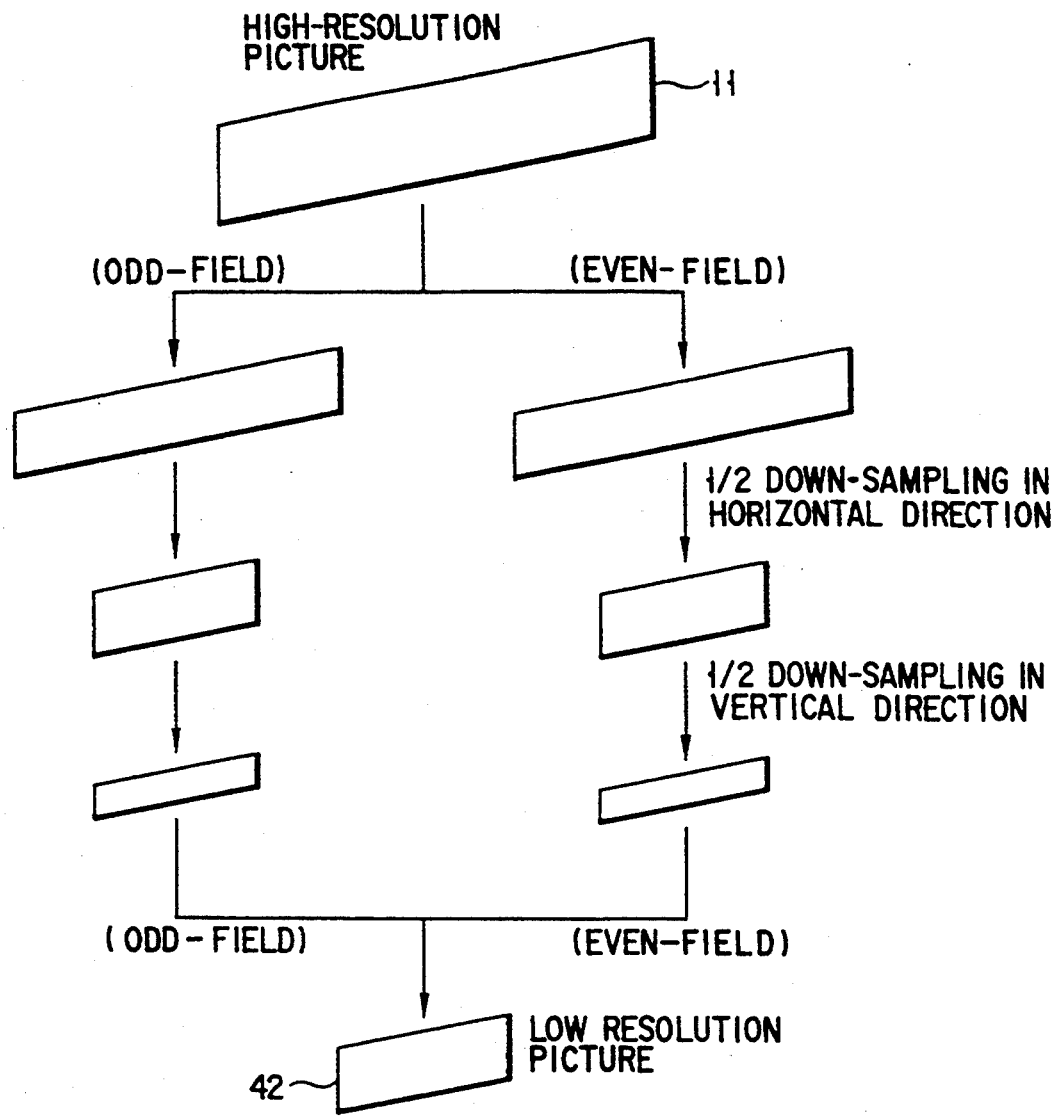
FIG. 16 is a diagram showing a first example of procedures for down-sampling a high-resolution input signal to a low-resolution signal in a down-sampling circuit in the motion picture coding apparatus in FIG. 15.
Figure 17:
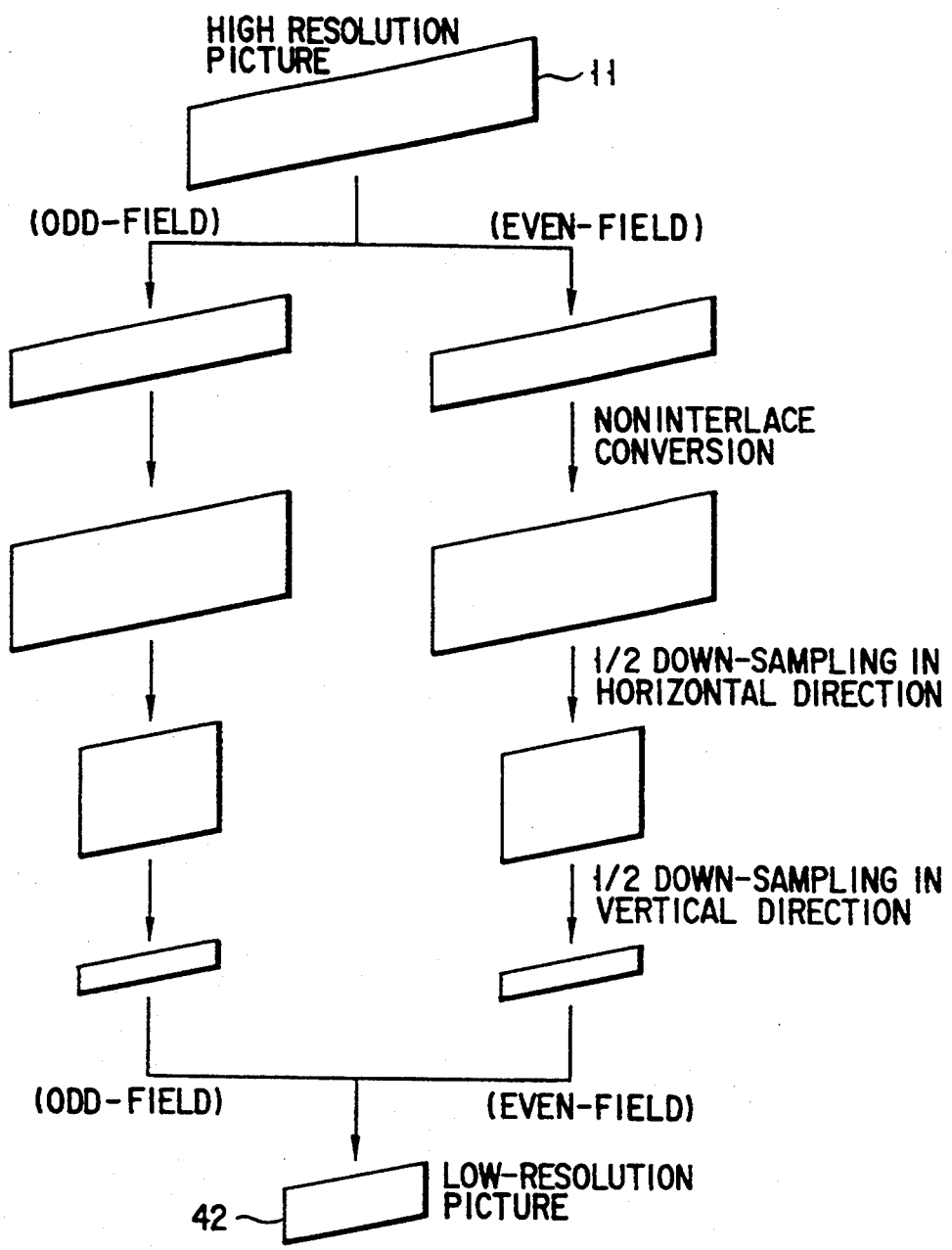
FIG. 17 is a diagram showing a second example of procedures for down-sampling a high-resolution input signal to a low-resolution signal in a down-sampling circuit in the motion picture coding apparatus in FIG. 15.

The down-sampling circuit 29 performs processing shown in FIG. 16 or FIG. 17, for example. FIG. 16 illustrates a process of executing down-sampling in a field. The high-resolution picture signal is down-sampled in the horizontal direction and vertical direction every field, yielding a low-resolution picture signal. As shown in FIG. 25, the relationship between the vertical pixel positions of the high-resolution picture signal and low-resolution picture signal differs between odd fields and even fields, so that the vertical down-sampling to be executed for odd fields would differ from that for even fields.

That is, down-sampling for odd fields is performed by executing filtering of odd taps using filter coefficients for odd fields, such as −29, 0, 88, 138, 88, 0, and −29/256, whereas down-sampling for even fields is performed by executing filtering of even taps using filter coefficients for even fields, such as −4, 23, 109, 109, 23, and −4/256.

FIG. 17 illustrates a process in a system of executing down-sampling after an interlaced picture is converted to a non-interlaced picture. In the non-interlace conversion, a process or time spatial process adapted to motion is performed, as described in, for example, a document (1): C. L. Lee, S. Chang, C. W. Jen, "Motion Detection and Motion Adaptive Pro-scan Conversion", 1991 IEEE International Symposium on Circuits and Systems. Vol. 1, pp. 666–9, (June 1991), a document (2): A. Nguyen, Eric Dubois, "Spatio-temporal Adaptive Interlaced-to-progressive Conversion", International Workshop on HDTV '92, and a document (3): V. G. Devereux, "Standards Conversion between 1250/50 and 625/50 TV Systems", IBC 1992, pp. 51–5, (July, 1992).

Returning to FIG. 15, a low-resolution picture signal 42 obtained by the down-sampling circuit 29 is coded by a low-resolution picture coding circuit of a motion-compensation adaptive predictive coding system, which comprises a subtracter 43, a selector switch 44, a DCT circuit 45, a quantizer 46 and a variable-length coder 47. The output of this low-resolution picture coding circuit is sent via a buffer 31 to a transmission system or a storage system from an output terminal 32 at a predetermined bit rate. The output of the quantizer 46 is subjected to local decoding by a low-resolution local decoding circuit, which comprises an inverse quantizer 48, an inverse DCT circuit 49, an adder 50 and a selector switch 51. The output of this low-resolution local decoding circuit (the output of the selector switch 51), 56, is sent to two ways; one is written in a frame memory 52. The output of the frame memory 52 is input to a predictor 53 and is used to prepare a predictive signal 55 for coding a low-resolution picture signal.

Since the operations of the above-described low-resolution picture coding circuit, low-resolution local decoding circuit, buffer 31, frame memory 52 and predictor 53 are the same as those of the aforementioned high-resolution picture coding circuit, high-resolution local decoding circuit, buffer 20, frame memory 27 and predictor 28, except for the difference in resolution of signals to be treated, their detailed descriptions will be omitted.

The other part of the branched output 56 of the low-resolution local decoding circuit is input to an up-sampling circuit 60 to be up-sampled, yielding an up-sampling picture signal 65 which is a high-resolution picture signal. This up-sampling picture signal 65 is used to prepare a low-resolution predictive signal 62 in a second predictor 61.

A third predictor 63 produces a predictive signal 13 based on the high-resolution predictive signal 40 and the low-resolution predictive signal 62. The third predictor 63 may perform its processing to select either the high-resolution predictive signal 40 or the low-resolution predictive signal 62 as the predictive signal 13, or may produce a signal, obtained by weighting and adding those signals, as the predictive signal 13. The selection between the high-resolution predictive signal 40 and the low-resolution predictive signal 62, or the determination of the weighting coefficient has only to be performed by selecting the one which makes the square errors of the predictive signal 13 and the input high-resolution picture signal 11. The third predictor 63 outputs information, which indicates which signal, the high-resolution predictive signal 40 or the low-resolution predictive signal 62, has been selected as the predictive signal 13, or information 64 indicating the weighting coefficient used in prediction. This information is multiplexed with the output of the high-resolution picture coding circuit in the variable-length coder 19 before being sent out from an output terminal 21.

Figure 18:
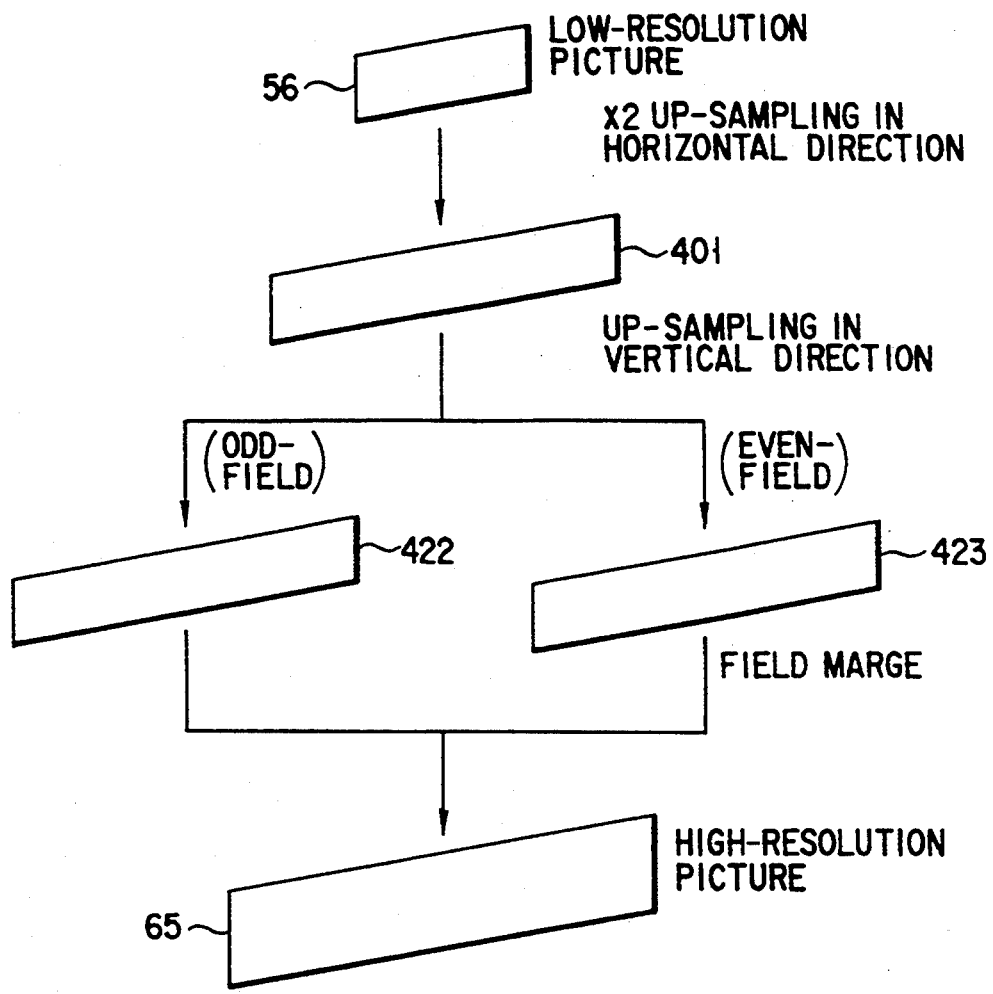
FIG. 18 is a diagram showing procedures for up-sampling a low-resolution signal to a high-resolution signal in an up-sampling circuit in the motion picture coding apparatus in FIG. 15.
Figure 24:
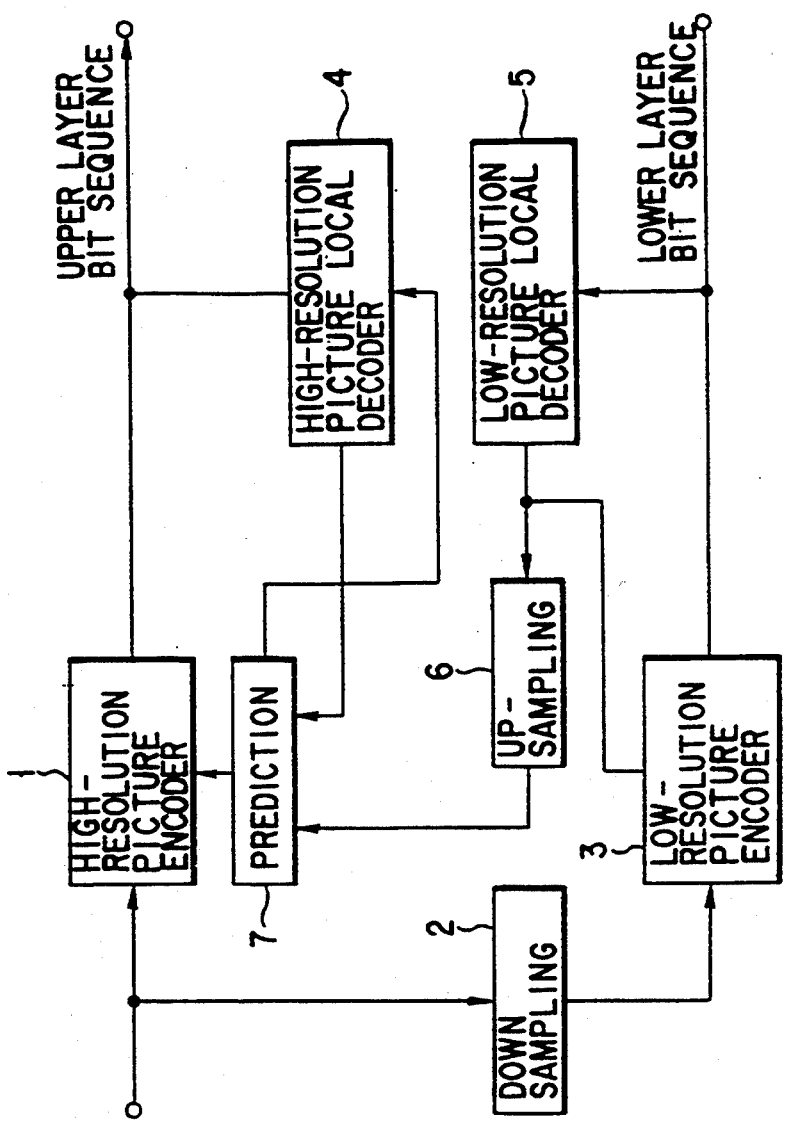
FIG. 24 is a block diagram exemplifying a motion picture coding apparatus having a scalability.

The up-sampling circuit 60, which characterizes this invention, will be described in detail below. FIG. 18 is for explaining the process of the up-sampling circuit 60. As illustrated, the low-resolution local decoded signal 56, which is the output of the low-resolution local decoding circuit, is up-sampled to be doubled in the horizontal direction, and is then subjected to vertical up-sampling, thus yielding the up-sampling picture signal 65, which is a high-resolution picture signal.

FIG. 19 is a block diagram showing a vertical up-sampling circuit portion of the up-sampling circuit 60, which performs vertical up-sampling in FIG. 18. In this vertical up-sampling circuit portion, an intra-field up-sampling signal and an intra-frame up-sampling signal are adaptively weighted and added.

In other words, a signal 401 obtained by horizontal up-sampling of the low-resolution local decoded signal 56, which is input from a horizontal up-sampling circuit portion in the up-sampling circuit 60, which performs horizontal up-sampling in FIG. 18, is separated into an odd-field signal 403 and an even-field 404 in a first field separator 402. The odd-field signal 403 and even-field signal 404 are subjected to vertical interpolation in an odd-numbered field intra-field interpolation circuit 405 and an even-numbered field intra-field interpolation circuit 406, respectively, using the signals in the individual fields, thus producing an odd-field intra-field interpolation signal 407 and even-field intra-field interpolation signal 408.

The odd-field intra-field interpolation circuit 405 and the even-field intra-field interpolation circuit 406 perform processes to prepare a signal marked by "x" from a signal marked by "o" and interpolate a signal marked by "Δ" with a signal marked by "□" in FIG. 25, and, more specifically, perform the computations to execute linear interpolation of, for example, upper and lower lines in accordance with the distance, which are expressed by the following equations.

$fso(i*2) = of(i)$
$fso(i*2+1) = (of(i) + of(i+1))/2$
$fse(i*2) = (3*fe(i) + fe(i-1))/4$
$fse(i*2+1) = (3*fe(i) + fe(i+1))/4$ where fo: odd-field signal 403,
fe: even-field signal 404,
fso: odd-field intra-field interpolation signal 407,
fse: even-field intra-field interpolation signal 408, and
i : line number.

An odd-numbered field intra-frame interpolation circuit 447 and an even-numbered field intra-frame interpolation circuit 448 perform field-overlapped vertical interpolation using signals of two fields to produce an odd-field intra-frame interpolation signal 409 and an even-field intra-frame interpolation signal 410. This process is to interpolate a signal marked by "x" and a signal marked by "Δ" using both of a signal marked by "o" and a signal marked by "□", and performs computations expressed by, for example, the following equations.

$fto(i*2) = fo(i)$
$fto(i*2+1) = fe(i)$
$fte(i*2) - (fo(i) + fe(i))/2$
$fte(i*2+1) = (fe(i) + fo(i+1))/2$.

The odd ( even ) -field intra-field interpolation signal 407 (408) and the odd (even)-field intra-frame interpolation signal 409 (410) are respectively multiplied by weighting coefficients wo(we) and 1-Wo(1-We) in multipliers 416 (417) and 418 (419), and are then added by an adder 420 (421), yielding an odd (even)-field up-sampling picture signal 422 (423).

The weighting coefficients Wo and we ($0 \leq Wo$, $We \leq 1$) are determined with the input high-resolution picture signal 11 taken as a reference signal. More specifically, the input high-resolution picture signal 11 is separated, by a second field separator 411, into a high-resolution odd-field signal 412 and a high-resolution even-field signal 413, which are in turn input to an odd-numbered field weighting decision circuit 414 and an even-numbered field weighting decision circuit 415, respectively. For instance, of several candidates for the weighting coefficients, those which minimize the square mean values or the sums of the absolute values of the differences between the up-sampling picture signals 422 and 423 and the input signals 412 and 413, have only to be selected. Alternatively, coding may be tried to select that weighting coefficient which minimizes the amount of codes. Selective information 430 and 431 of the weighting coefficients are sent as side information 440.

The candidates for the weighting coefficients Wo and we may only be 0 and 1. In this case, either the intra-field up-sampling or the intra-frame up-sampling is used, so that the multipliers 416 to 419 and the adders 420 and 421 are unnecessary, and instead, a switch should be provided which selects either the intra-frame up-sampling signal or the intra-field up-sampling signal for each field in accordance with motion decision information.

The weighting coefficients may be shared with the other selective information necessary for coding, thus eliminating the need for the side information. For instance, in the case of the coding system for switching between frame DCT and field DCT for each given area of a picture, the weighting coefficients may be determined based on this switching information. Conversely, the weighting coefficients may be determined in the previously described manner, and whether to use the frame DCT or field DCT may be determined based on the coefficients. In the case of the system of switching prediction methods, such as motion compensation, for each given area of a picture, the weighting coefficients may be determined based on this switching information or the motion vector.

Further, the weighting coefficients may be determined based on the already-encoded information, such as the coding mode, the motion vector the size of an inter-frame difference of a local decoded picture for an already-coded area around an area to be coded, the coding mode, the motion vector and the size of an inter-frame difference of a local decoded picture for an already-coded frame, and the local decoded picture, thereby reducing the amount of the weighting coefficient information.

FIG. 20 is a block diagram showing the second example of the vertical up-sampling circuit portion of the up-sampling circuit 60. In FIG. 20, first and second field separators 502 and 511 perform the same processes as the first and second field separators 402 and 411 in FIG. 19.

An odd-numbered field motion-compensation up-sampling circuit 505 and even-numbered field motion-compensation up-sampling circuit 506 perform up-sampling motion-compensated from an odd-field signal 503 and an even-field signal 504 based on motion vectors 509 and 510 detected by first and second motion-vector detectors 507 and 508, yielding an odd-field up-sampling picture signal 422 and an even-field up-sampling picture signal 423, respectively.

The operations of the first and second motion-vector detectors 507 and 508 and the processes in the up-sampling circuits 505 and 506 in FIG. 20 will be described with reference to FIGS. 22A and 22B. The symbols "o," "□," "x" and "Δ" in FIGS. 22A and 22B mean the same as those in FIG. 25.

The first motion-vector detector 507 detects the motion vector from the even-field signal 504 to a high-resolution odd-field signal 512. With regard to that signal of the high-resolution odd-field signals which is spatially located at the same position as the low-resolution odd-field signal (signal marked by "x" overlapping the mark "o" in FIGS. 22A and 22B), the motion vector will not be detected and the low-resolution signal at the same position at the up-sampling time is used directly. With regard to that signal which is not spatially located at the same position as the low-resolution odd-field signal (signal marked by "x" and not overlapping the mark "o" in FIGS. 22A and 22B), the motion vector from the low-resolution even-field signal 504 (signal marked by "□") with the square mean value or the sum of the absolute values of the differences, etc., taken as an evaluation reference for every given unit area, or in such a way as to minimize the amount of codes originating from some temporary coding, and a signal obtained by subjecting the low-resolution even-field signal to motion compensation based on this motion vector.

The second motion-vector detector 507 detects the motion vector from the odd-field signal 503 to a high-resolution even-field signal 513. At this time, either one of FIGS. 22A and 22B is fixed, or motion compensation which provides a smaller square error with, for example, the input high-resolution picture signal 11 is selected, based on the motion vector 509 obtained by the first motion-vector detector 508.

In FIG. 22A, a signal 652, which is obtained by subjecting a low-resolution odd-field signal to motion compensation using a vector 651, attained by reversing the motion vector 509 from the low-resolution even field to the high-resolution odd field in both the horizontal and vertical directions and shifting it downward by $+\frac{1}{2}$, is used as an up-sampling signal for odd lines, and a signal 654, which is obtained by subjecting a low-resolution odd-field signal to motion compensation using a vector 653, attained by reversing the motion vector 509 in both the horizontal and vertical directions is used directly or an interpolation signal with a low-resolution even-field signal 655 thereabove by one line is used as an up-sampling signal for even lines.

In FIG. 22B, a signal 662, which is obtained by subjecting a low-resolution odd-field signal to motion compensation using a vector 661, attained by reversing the motion vector 509 in both the horizontal and vertical directions and shifting it upward by $+\frac{1}{2}$, is used as an up-sampling signal for even lines, and a signal 664, which is obtained by subjecting a low-resolution odd-field signal to motion compensation using a vector 663, attained by reversing the motion vector 509 in both the horizontal and vertical directions is used directly or an interpolation signal with a low-resolution even-field signal 665 thereunder by one line is used as an up-sampling signal for odd lines.

Information 520 indicating which one of the motion vector 509 and FIGS. 22A and 22B has been selected is sent as side information 440.

The motion vector may be detected by conducting a search around a vector obtained by compensating the motion vector of a low-resolution picture or a high-resolution picture in accordance with the field time. Accordingly, even if the search range for the motion vector is made narrower than the case of the direct searching, nearly the same advantage will be obtained. In the case where the motion vector used in the low-resolution picture coding is compensated before its usage, this motion vector information can also be obtained on the decoder side, so that the motion vectors obtained by the motion-vector detectors 507 and 508 and information about the difference between those motion vectors may be transmitted. This will reduce the amount of the motion vector information.

FIG. 21 is a block diagram showing the third example of the vertical up-sampling circuit portion of the up-sampling circuit 60. In FIG. 21, a field separator 602 performs the same processing as the field separator 402 in FIG. 19.

An odd-numbered field motion-compensation up-sampling circuit 605 and an even-numbered field motion-compensation up-sampling circuit 606 perform up-sampling of an odd-field signal 603 and an even-field signal 604, which has undergone motion compensation based on the motion vectors 609 and 610 computed by a motion-vector computing circuit 607, thus yielding an odd-field up-sampling picture signal 422 and an even-field up-sampling picture signal 423.

The motion-vector computing circuit 607 computes the motion vector which is obtained by compensating the motion vector 608, used in the prediction of the low-resolution signal coding, in accordance with the field distance. As the motion vector from the low-resolution odd-field signal to the high-resolution even-field signal, vectors 762 and 763 attained by rounding a vector 761, obtained by compensating the low-resolution motion vector in accordance with the field distance as shown in, for example, FIG. 23A, for each line of the low-resolution, or a vector 764 obtained by performing the rounding for every $\frac{1}{2}$ line, odd-field signal, may be used, and when the motion vector is rounded every $\frac{1}{2}$ line, the signal of a non-integer line may be prepared by interpolation of the mentioned line.

As the motion vector from the low-resolution even-field signal to the high-resolution odd-field signal, a vector 752 attained by rounding a vector 751, obtained by compensating the low-resolution motion vector in accordance with the field distance as shown in, for example, FIG. 23B, for each line of the low-resolution, or a vector 753 obtained by performing the rounding for every ½ line, odd-field signal, may be used. For odd fields, if there is a line located at spatially the same position in the low-resolution picture odd-field, the signal of that line is used, and motion compensation will be performed only on those lines which are not located at spatially the same positions.

A signal motion-compensated from the opposite field to the low-resolution local decoded signal may be used directly as an up-sampling signal for both the odd and even fields, or a signal weighted with the low-resolution local decoded signal of the same field may be used as an up-sampling signal. In this case, the weighting coefficient may be fixed or may be determined based on the magnitude of the motion vector, or the size of the vector dropped off when the motion vector is rounded.

Since it is possible to compute the motion vector on the decoder side in the same procedures as the motion-vector computing circuit 607, it is unnecessary to send the motion vector.

In the previous embodiments, when a signal obtained by weighting and adding the high-resolution predictive signal 40 and the low-resolution predictive signal 62 is to be added to a candidate for prediction, the weighting coefficient used in this weighting and addition may be selected in such a way as to minimize the square error with the high-resolution input signal and may be sent as side information, or may be determined in accordance with the magnitude of the high-resolution motion vector. In addition, the weighting coefficient in use may be different for each field. In this case, since the high-resolution motion vector information can be obtained on the decoder side, the motion vector in use may be computed based on the high-resolution motion vector compensated in accordance with the field time.

Further, if the up-sampling circuit having the vertical up-sampling circuit portion shown in FIG. 20 is used, the difference between the motion vectors used in coding a high-resolution picture may be obtained and sent as the motion vector information.

As described above, this invention will provide a motion picture coding apparatus, which has a higher coding efficiency than the prior art, has a scalability to ensure simultaneous coding of a plurality of picture signals of different resolutions, subjected to interlace scanning, like an HDTV signal and the current TV signal, and which performs improved up-sampling at the time of performing prediction for the coding of an interlace-scanned high-resolution picture signal, obtained by up-sampling an interlace-scanned low-resolution local decoded signal, thus improving the prediction efficiency.

We claim:
1. A motion picture coding apparatus comprising:
   first coding means for coding a high-resolution picture as a frame picture block by block;
   first local decoding means for decoding a coding result from said first coding means to obtain a high-resolution local decoded signal;
   predicting means for attaining a high-resolution predictive signal from said high-resolution local decoded signal;
   converting means for converting said high-resolution picture to a low-resolution picture;
   second coding means for coding said low-resolution picture;
   second local decoding means for decoding a coding result from said second coding means so as to obtain a low-resolution local decoded signal;
   means for up-sampling said low-resolution local decoded signal as a low-resolution predictive signal; and
   means for producing a prediction signal for even and odd lines of blocks separately, from said low-resolution predictive signal and said high-resolution predictive signal.

2. The motion picture coding apparatus according to claim 1, wherein said means for up-sampling supplies a signal obtained by shifting said signal up-sampled by an amount corresponding to motion within a field period, to candidates for said low-resolution predictive signal.

3. A motion picture coding apparatus comprising:
   first coding means for performing predictive coding on a high-resolution picture;
   first local decoding means for decoding a coding result from said first coding means to obtain a high-resolution local decoded signal;
   predicting means for attaining a high-resolution predictive signal from said high-resolution local decoded signal;
   converting means for converting said high-resolution picture to a low-resolution picture;
   second coding means for coding said low-resolution picture;
   second local decoding means for decoding a coding result from said second coding means to obtain a low-resolution local decoded signal;
   means for up-sampling said low-resolution local decoded signal as a low-resolution predictive signal, and
   means for producing a prediction signal by using a weighted sum of said low-resolution predictive signal and said high-resolution predictive signal when a prediction mode is used when coding said high-resolution picture.

* * * * *